US011856471B2

(12) United States Patent
Seo

(10) Patent No.: US 11,856,471 B2
(45) Date of Patent: Dec. 26, 2023

(54) METHOD AND APPARATUS FOR EDGE COMPUTING SERVICE

(71) Applicant: Samsung Electronics Co., Ltd., Suwon-si (KR)

(72) Inventor: Jihwan Seo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 220 days.

(21) Appl. No.: 17/156,117

(22) Filed: Jan. 22, 2021

(65) Prior Publication Data

US 2021/0235355 A1    Jul. 29, 2021

(30) Foreign Application Priority Data

Jan. 23, 2020  (KR) .......................... 10-2020-0009392

(51) Int. Cl.
*H04W 36/32* (2009.01)
*H04W 36/14* (2009.01)

(52) U.S. Cl.
CPC ........... *H04W 36/32* (2013.01); *H04W 36/14* (2013.01)

(58) Field of Classification Search
CPC . H04W 36/32; H04W 36/14; H04W 36/0016; H04W 36/02; H04W 36/125; H04W 36/385
USPC .................................. 370/331; 455/436–443
See application file for complete search history.

(56) References Cited

U.S. PATENT DOCUMENTS

| 9,258,666 | B2 | 2/2016 | Agrawal et al. |
| 9,554,308 | B2 | 1/2017 | Ambriss et al. |
| 10,110,495 | B1 | 10/2018 | Sabella et al. |
| 10,827,401 | B2 | 11/2020 | Li et al. |
| 2013/0229939 | A1* | 9/2013 | Teyeb ................... H04W 36/30 370/252 |

(Continued)

FOREIGN PATENT DOCUMENTS

| KR | 10-1817458 | 1/2018 |
| WO | 2018/191977 | 10/2018 |

(Continued)

OTHER PUBLICATIONS

Search Report and Written Opinion dated Apr. 19, 2021 in counterpart International Patent Application No. PCT/KR2021/000908.

(Continued)

*Primary Examiner* — Michael Y Mapa
(74) *Attorney, Agent, or Firm* — Nixon & Vanderhye, P.C.

(57) ABSTRACT

An example method of providing, by a source edge data network, a service to a terminal in a wireless communication system includes: identifying a target edge data network, to which the terminal is expected to perform a handover, based on position information of the terminal; determining whether transmission of expected data, which the target edge data network is expected to transmit to the terminal in relation to the service after the handover is performed, will be delayed; transmitting a message requesting the expected data to the target edge data network, based on the determination that the transmission of the expected data will be delayed; receiving data related to the service corresponding to the expected data from the target edge data network; and transmitting the data related to the service to the terminal.

36 Claims, 12 Drawing Sheets

(56) References Cited

U.S. PATENT DOCUMENTS

| | | |
|---|---|---|
| 2015/0282207 A1 | 10/2015 | Ambriss et al. |
| 2018/0242204 A1 | 8/2018 | Zhu et al. |
| 2018/0249389 A1 | 8/2018 | Zhu et al. |
| 2018/0253980 A1 | 9/2018 | Mohamadi |
| 2019/0028934 A1 | 1/2019 | Rasanen et al. |
| 2019/0035285 A1 | 1/2019 | Priest |
| 2019/0045409 A1* | 2/2019 | Rasanen ............... H04W 88/16 |
| 2019/0075153 A1 | 3/2019 | Chen et al. |
| 2019/0090167 A1 | 3/2019 | Lu et al. |
| 2019/0090169 A1 | 3/2019 | Lu et al. |
| 2019/0268812 A1 | 8/2019 | Li et al. |
| 2019/0342814 A1 | 11/2019 | Imai |
| 2020/0053167 A1 | 2/2020 | Yang et al. |
| 2020/0154459 A1* | 5/2020 | Mukherjee .......... H04L 65/1016 |
| 2020/0213384 A1* | 7/2020 | Rasool ................. H04L 65/612 |
| 2022/0070750 A1* | 3/2022 | Yamagishi .............. H04L 65/80 |

FOREIGN PATENT DOCUMENTS

| | | |
|---|---|---|
| WO | 2019/011408 | 1/2019 |
| WO | 2019/221352 | 11/2019 |

OTHER PUBLICATIONS

Taleb, Tarik et al., "On Multi-Access Edge Computing: A Survey of the Emerging 5G Network Edge Cloud Architecture and Orchestration," IEEE Communications Surveys & Tutorials; vol. 19, No. 3, May 18, 2017, 27 pages.

3rd Generation Partnership Project; Technical Specification Group Services and System Aspects; Study on application architecture for enabling Edge Applications (Release 17), 3GPP TR 23.758 V17.0.0 Dec. 19, 2019 (115 pages).

Extended Search Report dated 2023-06-14 in European Patent Application No. 21743676.5.

* cited by examiner

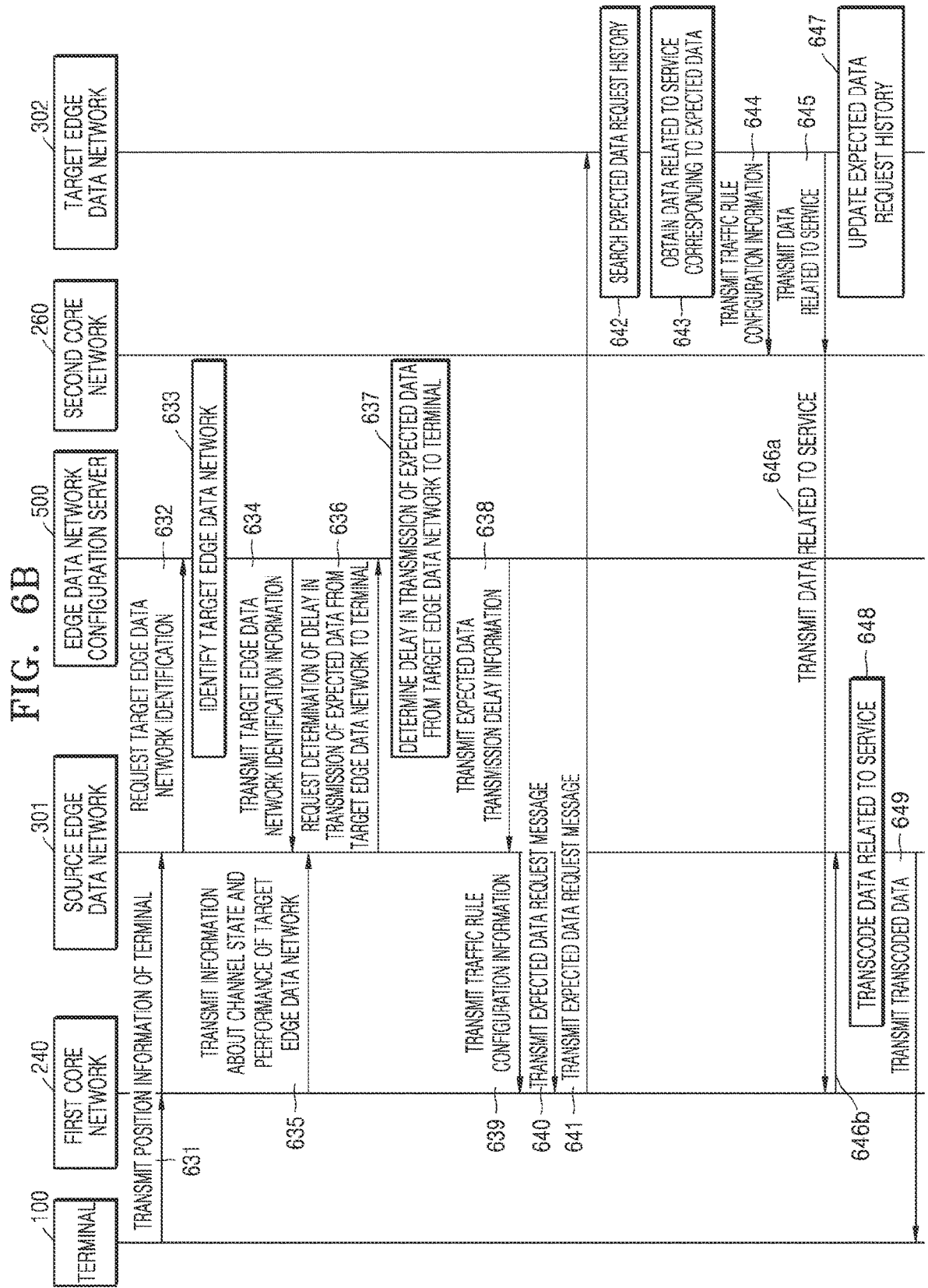

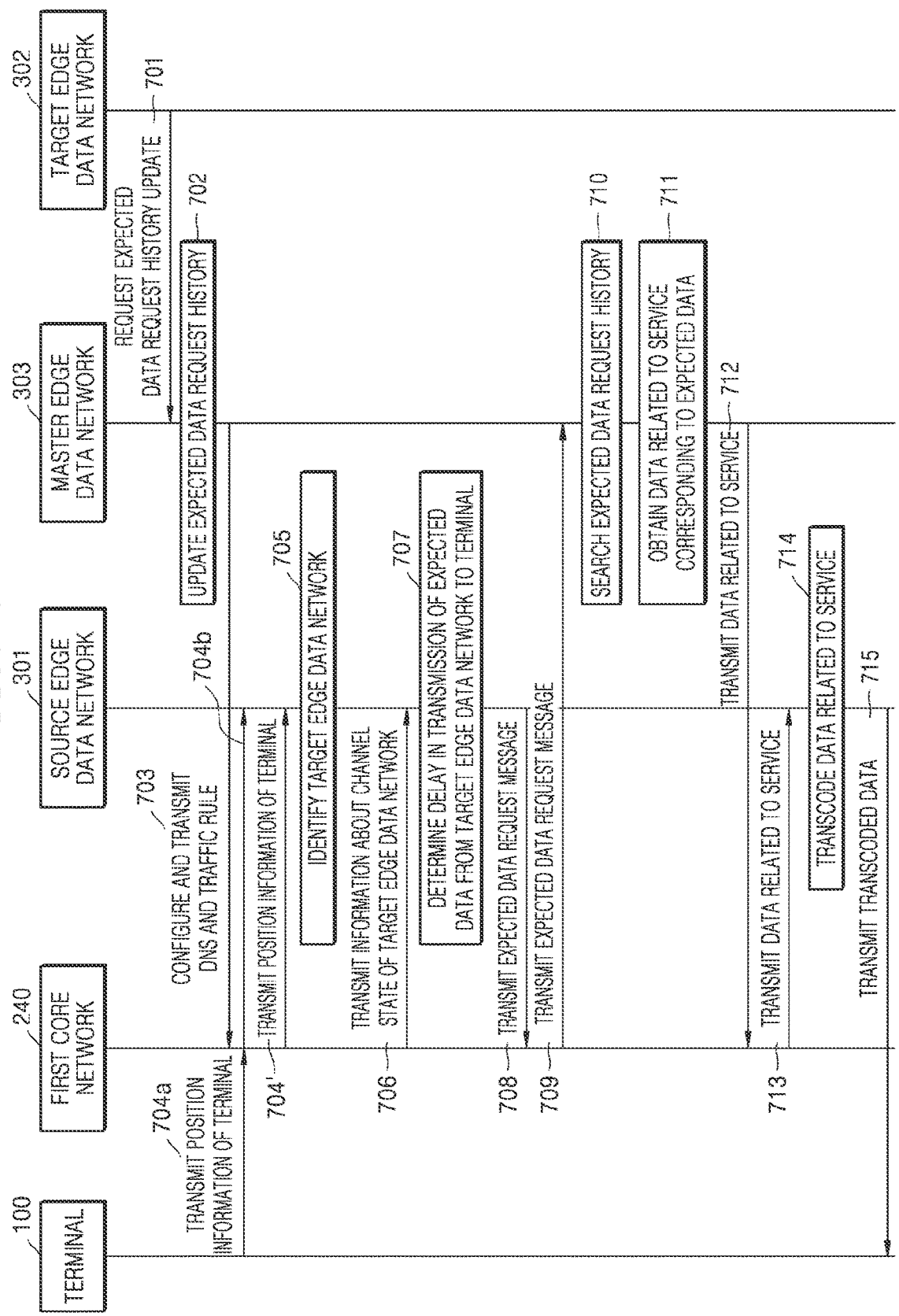

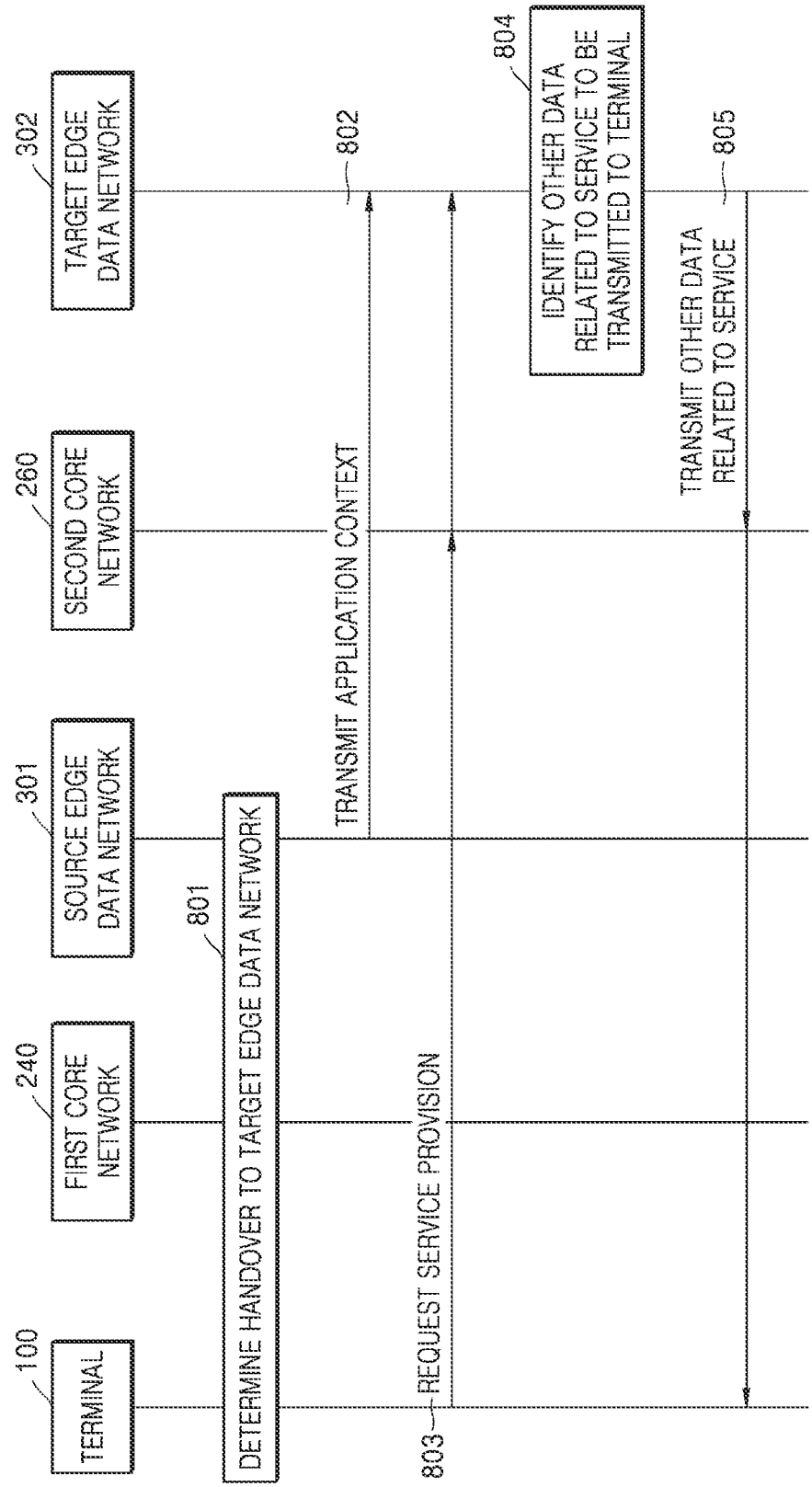

METHOD AND APPARATUS FOR EDGE COMPUTING SERVICE

CROSS-REFERENCE TO RELATED APPLICATION

This application is based on and claims priority under 35 U.S.C. § 119 to Korean Patent Application No. 10-2020-0009392, filed on Jan. 23, 2020, in the Korean Intellectual Property Office, the disclosure of which is incorporated by reference herein in its entirety.

BACKGROUND

1. Field

The disclosure relates to methods and apparatuses for edge computing services (e.g., multi-access edge computing (MEC) services).

2. Description of Related Art

Recently, edge computing technology for transmitting data using an edge server has been discussed. Edge computing technology may include, for example, multi-access edge computing (MEC) or fog computing (FOC). Edge computing technology may refer to technology for providing data to an electronic apparatus through a separate server (hereinafter referred to as an "edge data network" or "MEC server") provided at a position geographically close to the electronic apparatus, for example, in or near a base station. For example, among at least one application installed in an electronic apparatus, an application requiring low latency may transmit/receive data through an edge server located at a geographically close position, instead of through a server located in an external data network (DN) (e.g., Internet).

Recently, a service using the edge computing technology (hereinafter, referred to as "MEC-based service" or "MEC service") has been discussed, and research and development on electronic apparatuses have been conducted to support an MEC-based service. For example, an application of an electronic apparatus may transmit/receive edge computing-based data to/from an edge server (or an application of an edge server) on an application layer.

With the progress of research and development for supporting an MEC-based service, a scheme for shortening the latency of an edge data network (e.g., an MEC server) providing an MEC-based service has been discussed. For example, in providing a service to a terminal using an edge computing service, a method of eliminating a delay that may occur due to a handover of the terminal has been discussed.

SUMMARY

Embodiments of the disclosure provide an edge data network providing a service to a terminal without and/or reducing delay due to handover using an edge computing service.

Additional aspects will be set forth in part in the description which follows and, in part, will be apparent from the description.

According to an example embodiment, a method of providing, by a source edge data network, a service to a terminal in a wireless communication system includes: identifying a target edge data network, to which the terminal is expected to perform a handover, based on position information of the terminal; determining whether transmission of expected data, which the target edge data network is expected to transmit to the terminal in relation to the service after the handover is performed, will be delayed; transmitting a message requesting the expected data to the target edge data network, based on determining that the transmission of the expected data will be delayed; receiving data related to the service corresponding to the expected data from the target edge data network; and transmitting the data related to the service to the terminal.

According to an example embodiment, a method of providing, by a target edge data network, a service to a terminal in a wireless communication system includes: receiving a message requesting expected data, which the target edge data network is expected to transmit to the terminal in relation to the service after performance of a handover of the terminal to the target edge data network, from a source edge data network providing the service to the terminal; obtaining data related to the service corresponding to the requested expected data, based on the message requesting the expected data; and transmitting the obtained data to the source edge data network.

According to an example embodiment, a source edge data network providing a service to a terminal in a wireless communication system includes: a communicator including communication circuitry; a memory storing a plurality of instructions; and a processor configured to execute the instructions to: identify a target edge data network, to which the terminal is expected to perform a handover, based on position information of the terminal; determine whether transmission of expected data, which the target edge data network is expected to transmit to the terminal in relation to the service after the handover is performed, will be delayed; transmit a message requesting the expected data to the target edge data network, based on determining that the transmission of the expected data will be delayed; receive data related to the service corresponding to the expected data from the target edge data network; and transmit the data related to the service to the terminal.

According to an example embodiment, a target edge data network providing a service to a terminal in a wireless communication system includes: a communicator including communication circuitry; a memory storing a plurality of instructions; and a processor configured to execute the instructions to: receive a message requesting expected data, which the target edge data network is expected to transmit to the terminal in relation to the service after performance of a handover of the terminal to the target edge data network, from a source edge data network providing the service to the terminal; obtain data related to the service corresponding to the requested expected data, based on the message requesting the expected data; and transmit the obtained data to the source edge data network.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 6B is a signal flow diagram illustrating an example method of providing an MEC-based service to a terminal without delay and/or with reduced delay due to handover, according to various embodiments;

FIG. 7 is a signal flow diagram illustrating an example method of providing an MEC-based service to a terminal without delay and/or with reduced delay due to handover, according to various embodiments;

FIG. 8 is a signal flow diagram illustrating an example method of providing an MEC-based service to a terminal after handover, according to various embodiments;

DETAILED DESCRIPTION

Figure 1:
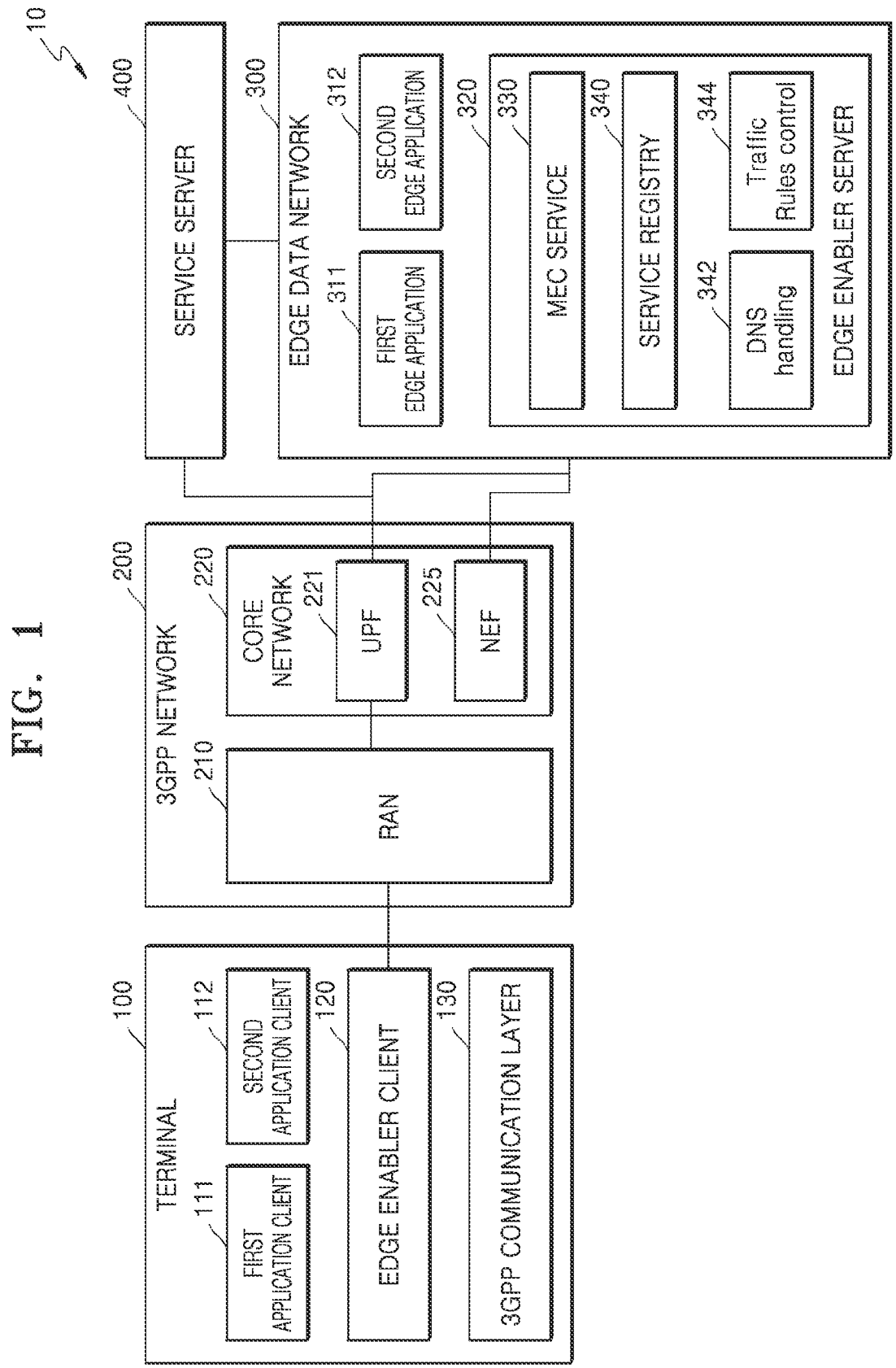
FIG. 1 is a diagram illustrating an example network environment for supporting a multi-access edge computing (MEC)-based service, according to various embodiments.

Hereinafter, various example embodiments of the disclosure will be described in greater detail with reference to the accompanying drawings.

In describing the various example embodiments, descriptions of technical contents that are well known in the technical field to which the disclosure belongs and are not directly related to the disclosure may be omitted.

Some components in the accompanying drawings may be exaggerated, omitted, or schematically illustrated. Also, the size of each component may not completely reflect the actual size thereof. In the drawings, the same or corresponding elements may be given the same reference numerals.

Advantages and features of the disclosure and methods of achieving the same will be apparent from the example embodiments of the disclosure described below in detail with reference to the accompanying drawings. The disclosure may, however, be embodied in many different forms and should not be construed as being limited to the embodiments of the disclosure described below; rather, these embodiments are illustrative and non-limiting, and will convey the scope of the disclosure to those of ordinary skill in the art. Throughout the disclosure, like reference numerals may denote like elements.

It will be understood that each block of process flowchart diagrams and combinations of flowchart diagrams may be performed by computer program instructions. Because these computer program instructions may be mounted on a processor of a general-purpose computer, a special-purpose computer, or other programmable data processing equipment, the instructions executed through a processor of a computer or other programmable data processing equipment may generate a means of performing the functions described in the flowchart block(s). Because these computer program instructions may be stored in a computer-executable or computer-readable memory that may be oriented to a computer or other programmable data processing equipment to implement a function in a particular manner, the instructions stored in the computer-executable or computer-readable memory may also produce a production item containing an instruction means of performing the functions described in the flowchart block(s). Because the computer program instructions may also be mounted on a computer or other programmable data processing equipment, the instructions performing a series of operations on the computer or other programmable data processing equipment to generate a computer-implemented process to perform the computer or other programmable data processing equipment may also provide operations for executing the functions described in the flowchart block(s).

Also, each block may represent a portion of a module, segment, or code including one or more executable instructions for executing one or more specified logical functions. Also, it should be noted that the functions mentioned in the blocks may also occur in a different order in some alternative implementation examples. For example, two blocks illustrated in succession may actually be performed substantially at the same time or may sometimes be performed in the opposite order depending on the corresponding function.

Also, the term "~unit" used herein may refer, for example, to a software component or a hardware component such as a field-programmable gate array (FPGA) or an application-specific integrated circuit (ASIC), and the "~unit" may perform some functions. However, the "~unit" is not limited to software or hardware. The "~unit" may be configured to be in an addressable storage medium or may be configured to operate one or more processors. Thus, as an example, the "~unit" may include components such as software components, object-oriented software components, class components, and task components and may include processes, functions, attributes, procedures, subroutines, segments of program code, drivers, firmware, microcode, circuits, data, databases, data structures, tables, arrays, and variables. A function provided in the components and "~units" may be combined into a smaller number of components and "~units" or may be further divided into additional components and "~units". In addition, the components and "~units" may be implemented to operate one or more central processing units (CPUs) in a device or a security multimedia card. Also, in embodiments of the disclosure, the "~unit" may include one or more processors.

Throughout the disclosure, the expression "at least one of a, b or c" indicates only a, only b, only c, both a and b, both a and c, both b and c, all of a, b, and c, or variations thereof.

Examples of a terminal may include, for example, a user equipment (UE), a mobile station (MS), a cellular phone, a smartphone, a computer, a multimedia system capable of performing a communication function, or the like.

In the disclosure, a controller may also be referred to as a processor.

Throughout the disclosure, a layer (or a layer apparatus) may also be referred to as an entity.

FIG. 1 is a diagram illustrating an example network environment for supporting a multi-access edge computing (MEC)-based service, according to various embodiments.

Referring to FIG. 1, a network environment 10 may include a terminal 100, a 3$^{rd}$ Generation Partnership Project (3GPP) network 200, an edge data network 300, and a service server 400. However, the configuration of network environment 10 is not limited to the configuration shown in FIG. 1.

According to an example embodiment, each of the components included in the network environment 10 may refer to a physical entity unit or may refer to a software or module unit capable of performing an individual function. Thus, the component included in the network environment 10 may be referred to as an entity or may be referred to as a function.

According to various embodiments, the terminal 100 may refer to a device used by a user. For example, the terminal 100 may refer to a user equipment (UE), a remote terminal, a wireless terminal, or a user device. Also, the terminal 100 may include all types of devices. For example, the terminal 100 may include a drone, an autonomous vehicle, an augmented reality (AR) device, a virtual reality (VR) device, a mobile phone, a smart phone, or the like.

According to example embodiments, the terminal 100 may drive (or execute) a plurality of application clients. For example, the terminal 100 may include a first application client 111 and a second application client 112. The plurality of application clients may request different network services based on at least one of the data transmission rate of the terminal 100, the delay time (or rate) (latency), the reliability, the number of terminals 100 accessing the network, the network access period of the terminal 100, or the average data usage. The different network services may include, for example, enhanced mobile broadband (eMBB), ultra-reliable and low-latency communication (URLLC), or massive machine type communication (mMTC).

The application client of the terminal 100 may refer, for example, to a basic application pre-installed in the terminal 100 or an application provided by a third party. That is, it may refer to a client application program driven in the terminal 100 for a particular application service. Various application clients may be driven in the terminal 100. At least one of the application clients may be used to provide a service from the edge data network 300 to the terminal 100. For example, the application client may be an application installed and executed in the terminal 100 and may provide a function of transmitting/receiving data through the edge data network 300. The application client of the terminal 100 may refer to application software (or module) that is executed on the terminal 100 to use a function provided by one or more particular edge applications.

According to various embodiments, a plurality of application clients 111 and 112 of the terminal 100 may perform data transmission with the service server 400 based on the required network service type or may perform edge computing-based data transmission with the edge data network 300. For example, when the first application client 111 does not require low latency, the first application client 111 may perform data transmission with the service server 400. As another example, when the second application client 112 requires low latency, the second application client 112 may perform MEC-based data transmission with the edge data network 300. However, the disclosure is not limited thereto, and the terminal 100 may determine whether to transmit/receive data to/from the service server 400 or the edge data network 300 based on various conditions other than the latency.

According to various embodiments, the application client of the terminal 100 may, for example, be referred to as a UE application (app), an application client, a client application (app), or a UE application. Hereinafter, for convenience, the application client of the terminal 100 will be referred to as an application client.

According to various embodiments, the terminal 100 may include an edge enabler client 120 and a 3GPP communication layer 130. According to an example embodiment, the edge enabler client 120 may refer to a layer that performs an operation in the terminal 100 for enabling the terminal 100 to use an MEC service. According to an example embodiment of the disclosure, the edge enabler client 120 may also be referred to as an MEC enabling layer (MEL). The edge enabler client 120 may determine which UE app may use an MEC service and connect a network interface such that data of the application client of the terminal 100 may be transmitted to the edge data network 300 providing an MEC service.

Also, the edge enabler client 120 may perform, with the 3GPP communication layer 130, an operation for allowing the terminal 100 to establish a data connection for using an MEC service. The 3GPP communication layer 130 may, for example, refer to a layer performing a modem operation for using a mobile communication system and may establish a wireless connection for data communication, register the terminal 100 in the mobile communication system, establish a connection for data transmission to the mobile communication system, and perform a function of transmitting/receiving data.

According to various embodiments, the 3GPP network 200 may be a wireless communication system conforming to the 3GPP standard and may be connected to the terminal 100 to provide a wireless communication service to the terminal 100. The 3GPP network 200 may include a radio access network (RAN) 210 and a core network 220. The 3GPP network 200 may include, for example, a $3^{rd}$ generation (3G) network, an LTE network, an LTE-A network, or a next-generation network (5G or NR). However, the disclosure is not limited thereto, and the 3GPP network 200 may include a network configured with other communication technologies.

According to various embodiments, the RAN 210 of the 3GPP network 200 may be a network directly connected to the terminal 100 and may be an infrastructure providing wireless access to the terminal 100. The RAN 210 may include a plurality of base stations, and the plurality of base stations may perform communication through an interface formed therebetween. At least some of the interfaces between the plurality of base stations may be wired or wireless. The base station may be referred to as a gNode B, an eNode B, a Node B, a base station (BS), a radio access unit, a base station controller, a node on the network, or any other terms having equivalent technical meanings thereof.

According to various embodiments, the core network 220 of the 3GPP network 200 may process data and control signals about the terminal 100 transmitted/received through the RAN 210. The core network 220 may perform various functions such as control of a user plane and a control plane, processing of mobility, management of subscriber information, charging, and interoperation with other types of systems (e.g., Long Term Evolution (LTE) systems). In order to perform the above various functions, the core network 220 may include a plurality of functionally-separated entities having different network functions (NFs).

For example, the core network 220 may include a user plane function (UPF) 221, an access and mobility management function (AMF) (not illustrated), a session management function (SMF) (not illustrated), a policy control function (PCF) (not illustrated), a network exposure function (NEF) 225, a user data management (UDM) (not illustrated), a network data analysis function (NWDAF) (not illustrated), and a gateway mobile location center (GMLC) (not illustrated).

The UPF 221 may provide a data path (or a data plane) between the terminal 100 and the edge data network 300. That is, the UPF 221 may function as a gateway for transmitting data (or data packets) transmitted/received by the terminal.

The terminal 100 and the edge data network 300 may transmit/receive data (or data packets) to/from each other through the UPF 221. The edge data network 300 may transmit/receive data to/from the UPF 221 through a data network (DN). The UPF 221 may be located near the edge data network 300 to support an MEC service to the terminal 100 and may transmit the data packet of the terminal 100 to the edge data network 300 with low latency or transmit the data packet of the edge data network 300 to the terminal 100 with low latency.

The UPF 221 may also be connected to a data network connected between the terminal 100 and the service server 400 through the Internet. The UPF 221 may route a data packet, which is to be transmitted through the Internet among the data packets transmitted by the terminal 100, to the data network between the service server 400 and the terminal 100.

The NEF 225 may be an NF that exposes the functions (capabilities) and services of the NFs of the 3GPP network 200 to the outside. The NEF 225 may be connected to an external server (e.g., the edge data network 300) to transmit information about an event occurring in an internal NF of the 3GPP network 200 to the external server or transmit information about an event requested by the external server to the internal NF. The functions and services exposed by the NEF 225 to the outside may include, for example, location-related event reporting of the terminal 100, session-related event reporting of the terminal 100, and mobility management event reporting of the terminal 100. The external server may subscribe the functions and services exposed by the NEF 225 to access the corresponding functions and services.

According to various embodiments, the edge data network 300 may refer to a server to which the terminal 100 is connected to use an MEC service. The edge data network 300 may be arranged in a base station of the 3GPP network 200 to which the terminal 100 is connected or at a position geographically close to the base station and may provide a service at least partially identical to the service provided by the service server 400. In an example embodiment of the disclosure, MEC may be referred to as multi-access edge computing or mobile edge computing.

According to various embodiments, the edge data network 300 may, for example, be referred to as an MEC server, an MEC host, an edge computing server, a mobile edge host, an edge computing platform, or the like.

According to various embodiments, the edge data network 300 may execute (or drive) a plurality of edge applications. For example, the edge data network 300 may execute a first edge application 311 and a second edge application 312. According to an example embodiment, the edge application may, for example, refer to an application provided by a third party in the edge data network 300 providing an MEC service. The edge application may, for example, be used to establish a data session with the application client in order to transmit/receive data related to the application client. That is, the edge application may establish a data session with the application client. According to an example embodiment, the data session may refer to a communication path established by the application client of the terminal 100 and the edge application of the edge data network 300 to transmit/receive data.

According to various embodiments, the edge data network 300 may provide a virtual resource to the edge application. The virtual resource may include, for example, at least one of a computing resource, a storage resource, or a network resource (e.g., a network bandwidth) that may be used by the edge application. The edge application of the edge data network 300 may be executed (or driven) as a virtual machine.

According to various embodiments, the application of the edge data network 300 may, for example, be referred to as an edge application, an MEC application (app), an edge application server, or an ME (MEC) app and edge application. Hereinafter, for convenience, the application of the edge data network 300 will be referred to as an edge application.

According to various embodiments, the edge data network 300 may include, for example, an edge enabler server 320. According to an example embodiment, the edge enabler server 320 may be referred to as a mobile edge computing (MEC) platform, a mobile edge (ME) platform (MEP), a platform, or the like.

According to various embodiments, the edge enabler server 320 may provide a function required to execute the edge application. For example, the edge enabler server 320 may provide a function or environment such that the edge application may provide an MEC service to the terminal 100 or the like or the edge application may use (consume) an MEC service. Also, the edge enabler server 320 may perform traffic control or perform Domain Name System (DNS) handling.

According to various embodiments, the MEC service may, for example, collectively refer to a procedure and information-related service required to use the edge application. The MEC service may be provided or used (consumed) by the edge enabler server 320 or the edge application. For example, the edge application may provide an MEC service to the terminal 100 or may use an MEC service provided by the edge enabler server 320 in order to provide an MEC service to the terminal 100. Also, the edge enabler server 320 may provide the edge application with an MEC service that may be used by the edge application to provide an MEC service to the terminal 100. Hereinafter, the MEC service may refer to a service that is provided by the edge data network 300 or the edge application to the terminal 100 or a service that is provided by the edge enabler server 320 and may be used by the edge application.

According to various embodiments, the edge enabler server 320 may provide an MEC service to the edge application. For example, the edge enabler server 320 may provide various information (data and content such as information about the position of the terminal, caching data, and information about the subscribed service) to the edge application according to the provided MEC service. The edge application may provide an MEC service to the terminal 100 using the MEC service provided by the edge enabler server 320. For example, the edge application may provide an MEC service to the terminal 100 based on the information provided as the MEC service by the edge enabler server 320. The MEC service provided to the terminal 100 may be a service necessary for the terminal 100 to drive the application client (e.g., data provision necessary for driving the application client). Hereinafter, the edge data network 300 providing a service to the terminal 100 may refer to the edge application of the edge data network 300 providing an MEC service that is necessary for the terminal 100 to drive the application client.

According to various embodiments, the edge enabler server 320 may include an MEC service 330 and a service registry 340. The MEC service 330 may provide a service to the edge applications included in the edge data network 300. The MEC service 330 may be implemented as a module or software capable of performing an individual function. The service registry 340 may provide information about a service available in the edge data network 300.

According to various embodiments, when an instance of the edge application is generated (installed), the edge enabler server 320 may internally register the edge application. The edge enabler server 320 may register the edge application and store information related to the edge application. The information related to the edge application stored by the edge enabler server 320 may include, for example, information about an MEC service that is to be provided by the edge application to the terminal 100 or the like and information about whether the MEC service is a service required by the edge application or an optional service.

According to various embodiments, the edge application may register a new MEC service in the edge enabler server 320 (service registration), update a pre-registered MEC service, or retrieve an MEC service registered in the edge enabler server 320. The edge application may provide information about the MEC service to be registered or updated to the edge enabler server 320 while registering or updating the MEC service in the edge enabler server 320. The edge enabler server 320 may register an MEC service in the service registry 340.

According to various embodiments, the edge enabler server 320 may transmit information about the MEC services registered in the service registry 340 to the edge application in the edge data network 300. For example, the edge enabler server 320 may transmit a list of MEC services registered in the service registry 340 to the edge application. Also, the edge enabler server 320 may transmit information about the availability of MEC services pre-registered or newly-registered in the service registry 340 to the edge application. The edge enabler server 320 may also provide for domain name system (DNS) handling 342 and traffic rules control 344.

According to various embodiments, the edge application may subscribe to the MEC service 330 registered in the service registry 340. The edge application may subscribe to the MEC service 330 by transmitting subscription request information about the MEC service 330 to the edge enabler server 320. The edge application "subscribing to" the MEC service 330 may, for example, mean that the MEC service or information about the MEC service is continuously received from the edge enabler server 320.

According to various embodiments, the service server 400 may provide content related to the application client of the terminal 100. For example, the service server 400 may provide a service or data necessary for the terminal 100 to drive (or execute) the application client and may provide the edge data network 300 with an edge application capable of providing an MEC service to the application client of the terminal 100. Also, the service server 400 may provide the edge data network 300 with a service or data necessary for the terminal 100 to drive (or execute) the application client. The service server 400 may be operated or managed by a content provider that provides content to the terminal 100.

Figure 2:
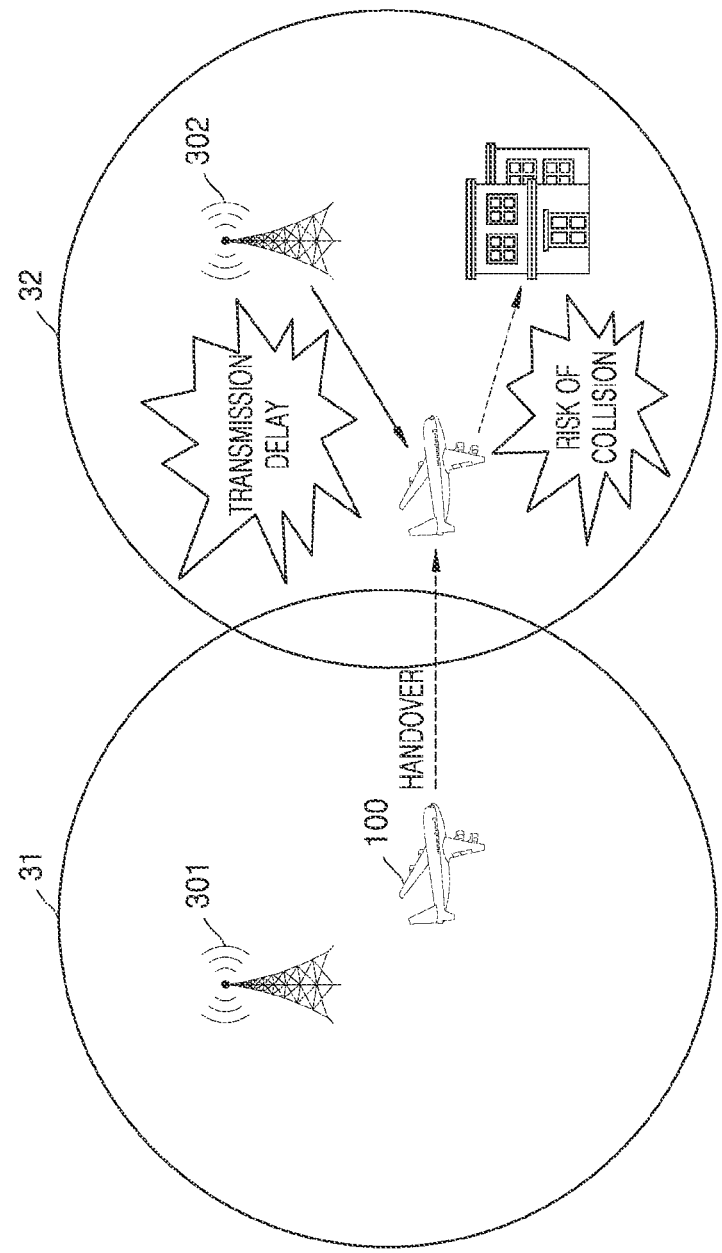
FIG. 2 is a diagram illustrating an example in which service provision to a terminal is delayed in a situation where the terminal performs a handover from a source edge data network to a target edge data network, according to various embodiments.

FIG. 2 is a diagram illustrating an example in which service provision to a terminal is delayed in a situation where the terminal performs a handover from a source edge data network to a target edge data network, according to various embodiments.

Referring to FIG. 2, the terminal 100 may be located in a service area 31 of a source edge data network 301, and the terminal 100 may receive a service from the source edge data network 301.

The terminal 100 may move from the service area 31 of the source edge data network 301 to a service area 32 of a target edge data network 302, and according to the movement, the terminal 100 may perform a handover from the source edge data network 301 to the target edge data network 302.

The handover of a terminal from a source edge data network to a target edge data network may, for example, refer to a technology for changing an edge data network providing a service to the terminal from the source edge data network to the target edge data network. Also, the handover of the terminal to the target edge data network (or performing the handover) may refer to performing a procedure of changing the edge data network providing a service to the terminal from the source edge data network to the target edge data network.

More particularly, a method of performing the handover may refer to relocating an application context (or an application instance) for the terminal from an edge application of the source edge data network (i.e., a source edge application) to an edge application of the target edge data network (i.e., a target edge application).

The edge data network providing a service to the terminal through the handover may be changed from the source edge data network to the target edge data network, and the terminal may continuously receive a service through the handover to another edge data network even when it is out of a service area of the connected edge data network.

Hereinafter, the source edge data network may refer to an edge data network that is currently connected to the terminal to provide a service to the terminal, and the source edge application may refer to an edge application of the source edge data network. Also, the target edge data network may refer to an edge data network that provides a service to the terminal after the handover is performed, and the target edge application may refer to an edge application of the target edge data network. Here, the target edge application may be an edge application that provides the same service as the source edge application.

The service area of the edge data network may refer to a coverage in which the edge data network may provide a service to terminals. The coverage in which the edge data network may provide a service to terminals may be determined according to the position of the edge data network, the communication capability of the edge data network, and the edge service providing capability of the edge data network (e.g., the type of a providable service). Here, the communication capability of the edge data network may be determined according to the communication capability (e.g., transmission/reception strength) of the base station connected to the edge data network. The service area may be different for each edge data network, and the handover may be performed as the terminal moves between the service areas of the edge data networks.

Referring to FIG. 2, the terminal 100 should receive a service from the target edge data network 302 after the handover is performed. However, after the handover, transmission of data related to a service, which the target edge data network 302 will have to transmit to the terminal 100 in order to provide a service to the terminal 100, may be delayed. For example, after the handover, a data transmission delay may occur due to a poor channel state between the target edge data network 302 and the terminal 100. Alternatively, a data transmission delay may occur when the target edge data network 302 needs time to process data to be transmitted to the terminal 100. Alternatively, a data transmission delay may occur when there are many terminals connected to the target edge data network 302 and thus the priority of data transmission to the terminal 100 is low. Alternatively, after the handover, a data transmission delay may occur according to the time taken for the target edge data network 302 to execute a target edge application for providing a service to the terminal 100.

Thus, the terminal 100 may face a dangerous situation as it fails to receive data for service provision from the target edge data network 302 after the handover. For example, when the terminal 100 is a drone, transmission of ground data, data for collision avoidance, or the like, which the target edge data network 302 should transmit to the terminal 100, may be delayed and the terminal 100 may have the risk of colliding with a tree, a streetlight, an outer wall of a building, or the like.

In the disclosure, a method of preventing a risk due to a data transmission delay, which may occur after the terminal 100 performs a handover from the source edge data network 301 to the target edge data network 302, will be described. Particularly, a method of expecting, by the source edge data network 301, a handover of the terminal 100 to the target edge data network 302, determining whether service provision (i.e., data transmission) to the terminal 100 after the handover will be delayed, pre-obtaining expected data to be provided to the terminal 100 from the target edge data network 302, and providing the expected data to the terminal 100 will be described.

Figure 3A:
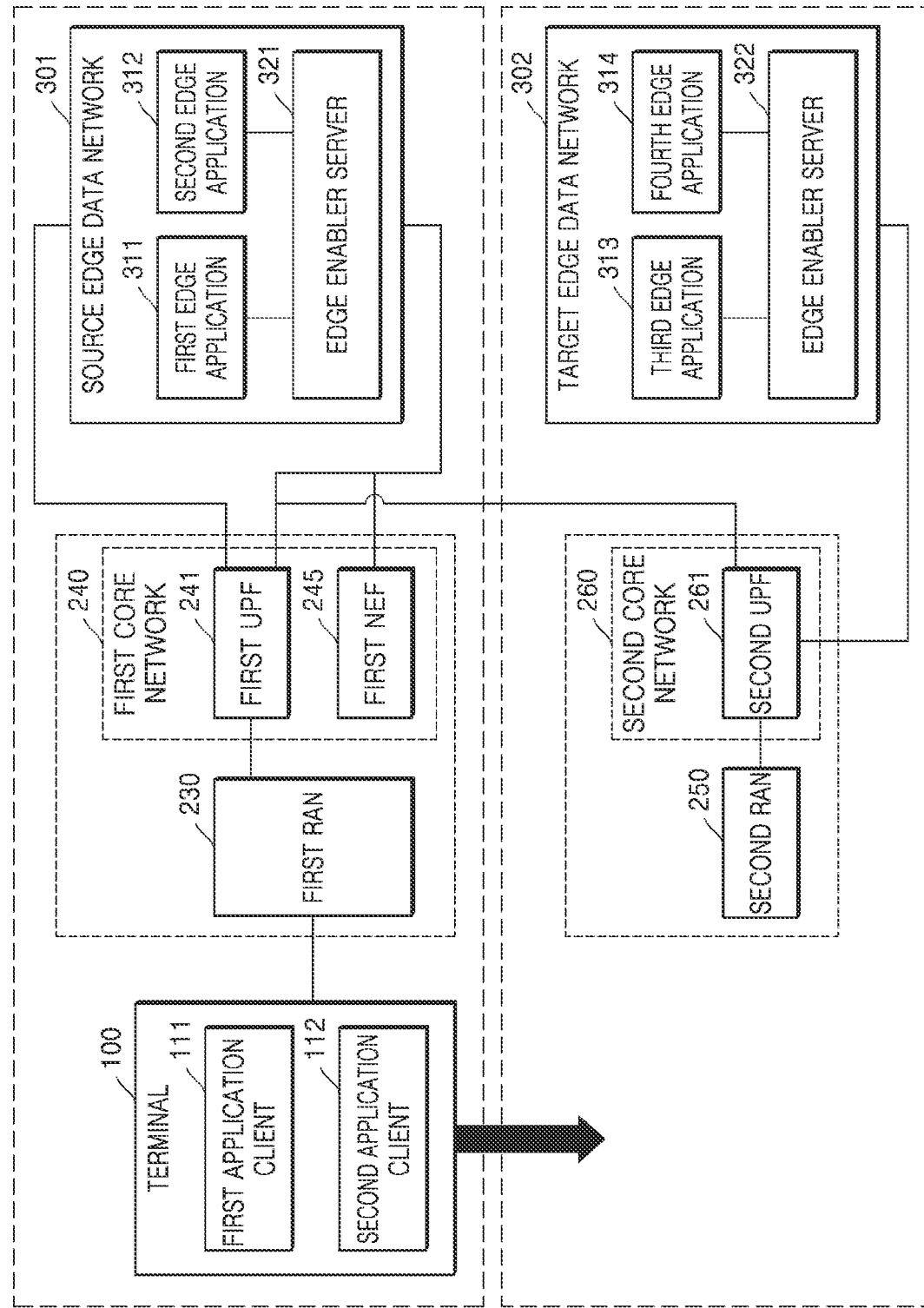
FIG. 3A is a diagram illustrating an example network environment for supporting an MEC-based service in a situation in which a terminal performs a handover, according to various embodiments.

FIG. 3A is a diagram illustrating an example network environment for supporting an MEC-based service in a situation in which a terminal performs a handover, according to various embodiments.

Referring to FIG. 3A, the terminal 100 may execute (or drive) the first application client 111 and the second application client 112. The terminal 100 may transmit/receive data related to the first application client 111 to/from the source edge data network 301 or the first edge application 311 through a first RAN 230 and a first UPF 241.

According to an example embodiment, a first core network 240 may be a core network connected to the first RAN 230 and the source edge data network 301. The first core network 240 may include a first UPF 241 and a first NEF 245 and may further include other network entities.

According to an example embodiment, the first UPF 241 may provide a data path (or a data plane) between the terminal 100 and the source edge data network 301. That is, the first UPF 241 may function as a gateway for transmitting data (or data packets) transmitted/received by the terminal 100. According to an example embodiment, the first NEF 245 may be connected to the source edge data network 301 to transmit an event or information generated from an internal NF of the 3GPP network to the source edge data network 301 or transmit an event or information requested by the source edge data network 301 to the internal NF.

According to various embodiments, the source edge data network 301 may be an edge data network that is connected to the terminal 100 to provide a service to the terminal 100. For this purpose, the source edge data network 301 may be arranged at a position close to the first RAN 230 to which the terminal 100 is connected.

According to various embodiments, the service provided by the source edge data network 301 may vary depending on the terminal 100 or the application client of the terminal 100. For example, the service provided by the source edge data network 301 may be a location-based service for providing data (e.g., map information or location-based content information) based on data (e.g., map information) that may vary depending on the position of the terminal 100, and may include at least one of a drone control service, an AR content providing service, a VR content providing service, or an autonomous driving information providing service.

According to various embodiments, the source edge data network 301 may store data (e.g., area information or geographic spatial information) about the service area 31 (FIG. 2) of the source edge data network 301. The edge application of the source edge data network 301 may provide a service to the terminal 100 based on data about the service area 31. The source edge data network 301 may not store information about the service area 32 (FIG. 2) of the target edge data network 302. When the handover of the terminal 100 from the source edge data network 301 to the target edge data network 302 is delayed, the source edge data network 301 may need to provide a service to the terminal 100 by obtaining information about the service area 32 of the target edge data network 302 or data transmitted by the target edge data network 302 to the terminal in the service area 32 for service provision.

According to various embodiments, the source edge data network 301 may execute a plurality of edge applications (e.g., a first edge application 311 and a second edge application 312) and may include an edge enabler server 321. However, the configuration of the source edge data network 301 is not limited to the configuration shown in FIG. 3A. Referring to FIG. 3A, the first edge application 311 may form a data session with the first application client 111 of the terminal 100. The first edge application 311 may provide a service to the first application client 111 and may transmit data for service provision. As used herein, the source edge data network 301 providing a service to the terminal 100 or transmitting data to provide a service may, for example, mean that the edge application (e.g., the first edge application 311) of the source edge data network 301 provides a service to the application client (e.g., the first application client 111) of the terminal 100 or transmits data for providing a service.

According to various embodiments, the source edge data network 301 may obtain position information of the terminal 100. For example, the source edge data network 301 may receive position information of the terminal 100 from at least one of the terminal 100 or the 3GPP network entity connected to the terminal 100. The position information of the terminal 100 may, for example, include information about the current position of the terminal 100, information about the position change thereof, information about the movement path thereof, or the like.

According to various embodiments, the source edge data network 301 may transmit a message requesting the position information of the terminal 100 to the terminal 100 and may receive the position information of the terminal 100 from the terminal 100. The position information of the terminal 100 that may be received from the terminal 100 may include, for example, position information of the terminal 100 obtained by the terminal 100 through a Global Positioning Service (GPS). In this case, the position information of the terminal 100 transmitted by the terminal 100 may be transmitted to the source edge data network 301 through the first RAN 230 and the first UPF 241.

According to various embodiments, the source edge data network 301 may receive position information of the terminal 100 from the 3GPP network entity connected to the terminal 100. For example, the source edge data network 301 may transmit a message requesting a subscription for event (e.g., the current position of the terminal, the position change thereof, or the position of the terminal in a particular situation) reporting related to the position of the terminal 100 exposed by the first NEF 245 of the 3GPP network connected to the terminal 100 and receive a report message about an event related to the position of the terminal 100 from the first NEF 245. The event related to the position of the terminal 100 may include an event related to the position of the terminal 100 detected by the AMF or the GMLC of the 3GPP network.

According to various embodiments, the report message about the event related to the position of the terminal 100 may be the position information of the terminal 100 and may include GPS information of the terminal 100, information about an area where the terminal 100 is located, information about a cell to which the terminal 100 is connected, or the like.

According to various embodiments, an operation of obtaining position information of the terminal 100 may be performed using an MEC service provided by the edge enabler server 321 of the source edge data network 301 (e.g., a location service for providing position information of the terminal 100 or the like).

According to various embodiments, information about the position of the terminal 100 obtained by the source edge data network 301 may be a combination of information about the position of the terminal 100 received from the first NEF 245 and information received from the terminal 100.

According to various embodiments, the source edge data network 301 may identify a movement path of the terminal 100 based on the obtained position information of the terminal 100. The movement path of the terminal 100 may be a path that the terminal 100 passes while moving from the current position and may be an actual movement path or an expected movement path of the terminal 100.

For example, the source edge data network 301 may identify the movement path of the terminal 100 by combining information about the current position of the terminal 100 included in the obtained position information of the terminal 100 and information about the position change of the terminal 100. Alternatively, the source edge data network 301 may receive information about the movement path of the terminal 100 as the position information of the terminal 100 from the terminal 100 or the 3GPP network entity connected to the terminal 100 (i.e., information about the movement path of the terminal 100 may be included in the position information of the terminal 100) and may identify the movement path of the terminal 100 through the received information.

According to various embodiments, the source edge data network 301 may identify the target edge data network 302, to which the terminal 100 is expected to perform a handover, based on the position information of the terminal 100. For example, the source edge data network 301 may identify the movement path of the terminal 100 based on the obtained position information of the terminal 100 and determine, based on the identified movement path of the identified terminal 100, that the terminal 100 will move to a certain area. As the terminal 100 moves to a certain area, the source edge data network 301 may expect to perform a handover to an edge data network providing a service to the certain area. The source edge data network 301 may determine the edge data network providing a service to the certain area as the target edge data network 302.

According to various embodiments, the source edge data network 301 may identify the target edge data network 302, to which the terminal 100 is expected to perform a handover, based on the strength of the signals received from the RANs or transmitted to the RANs. For example, the source edge data network 301 may receive, from the first RAN 230, the terminal 100, or the like, information about the strength of the signal transmitted/received by the terminal 100 to/from the first RAN 230 or another RAN (e.g., a second RAN 250). The source edge data network 301 may identify the target edge data network 302, to which the terminal 100 is expected to perform a handover, based on a change in the strength of the signals transmitted/received by the terminal 100 to/from the first RAN 230 currently connected or the strength of the signals transmitted/received to/from another RAN.

According to various embodiments, the source edge data network 301 may retrieve the edge data network (i.e., the target edge data network 302) providing a service to a certain area. For example, the source edge data network 301 may retrieve the target edge data network 302 based on at least one of position information (e.g., area information or cell information) of the terminal 100, information about the movement path of the terminal 100, or information about the certain area (e.g., cell information of the certain area).

More particularly, the source edge data network 301 may request an edge data network configuration server (EDN CS) or a DNS server for information about the target edge data network 302 and receive the information about the target edge data network 302 (e.g., an identifier of the target edge data network 302, an IP address thereof, or the like). The source edge data network 301 may identify the edge data network providing a service to a certain area based on the received information and determine the identified edge data network as the target edge data network 302. The edge data network configuration server will be described below in greater detail with reference to FIG. 3B.

According to various embodiments, the source edge data network 301 may expect a connection state between the terminal 100 and the target edge data network 302 after the terminal 100 has performed a handover from the source edge data network 301 to the target edge data network 302. Here, the connection state may refer, for example, to a connection state of a wireless communication channel and may include connection states of both uplink and downlink channels.

The source edge data network 301 may request the terminal 100 or the 3GPP network 200 connected to the terminal 100 (i.e., the first RAN 230 or the core network entity (e.g., the first NEF 245) to which the first RAN 230 is connected) for information about the channel state of the terminal 100 and information about the capability of the terminal 100 and receive information about the channel state and performance of the terminal 100 in response to the request. The information about the channel state of the terminal 100 may include information about the state of the channels currently connected to the terminal 100. The information about the performance of the terminal 100 may include information about the reception performance of the terminal 100 and information about the transmission capability of the terminal 100.

The source edge data network 301 may request the first RAN 230, the core network entity (e.g., the first NEF 245)

to which the first RAN 230 is connected, or the target edge data network 302 for information about the channel state of the target edge data network 302 and the performance of the target edge data network 302, and receive information about the channel state and performance of the target edge data network 302 in response to the request. The information about the channel state of the target edge data network 302 may include information about the state of channels connected to the target edge data network 302 (i.e., communication channels between the target edge data network 302 and terminals). The information about the performance of the target edge data network 302 may include information about the reception performance of the target edge data network 302 and information about the transmission capability of the target edge data network 302, which may be information about the performance of the antenna or the base station (e.g., the second RAN 250) that physically transmits/receives signals of the target edge data network 302.

The source edge data network 301 may expect a connection state between the terminal 100 and the target edge data network 302 after the handover based on information about the channel state of the terminal 100, information about the performance of the terminal 100, position information (or a movement path) of the terminal 100, information about the channel state of the target edge data network 302, information about the performance of the target edge data network 302, or the like.

For example, the source edge data network 301 may expect the connection state between the terminal 100 and the target edge data network 302 after the handover based on information about the channel state between the target edge data network 302 and other terminals located on the movement path of the terminal 100 and information about the performance of the terminal 100. Alternatively, based on information that the target edge data network 302 is connected to a plurality of terminals, it may be expected that the priority of data transmission from the target edge data network 302 to the terminal 100 after the handover will be low. Alternatively, based on information that the channel connection state between the target edge data network 302 and the terminals is not good, it may be expected that the connection state between the terminal 100 and the target edge data network 302 after the handover will be poor.

According to various embodiments, the source edge data network 301 may determine whether transmission of the expected data from the target edge data network 302 to the terminal 100 after performance of the handover will be delayed, based on an expected connection state between the terminal 100 and the target edge data network 302 after the handover of the terminal 100 to the target edge data network 302. For example, the source edge data network 301 may expect that the connection state between the terminal 100 and the target edge data network 302 after the handover will be poor and determine that transmission of the expected data from the target edge data network 302 to the terminal 100 will be delayed.

According to various embodiments, expected data which the target edge data network 302 is expected to transmit to the terminal 100 after performance of the handover may be data which the target edge data network 302 is expected to transmit to the terminals located in the service area of the data edge data network 302 in order to provide a service. For example, the expected data may be data consecutive with data that is transmitted by the source edge data network 301 to the terminal 100 for service provision and may be data that is to be transmitted to the terminal 100 in relation to the service as the terminal 100 moves to the service area of the target edge data network 302. Hereinafter, data which the target edge data network 302 is expected to transmit to the terminal 100 in relation to the service after the handover of the terminal 100 will be simply referred to as expected data.

According to various embodiments, in the case of providing a drone control service, the expected data may be, for example, information for avoiding the collision of the drone (i.e., the terminal 100), information about the movement path of the drone, or the like. Also, in the case of providing an AR/VR content providing service, the expected data may be content such as a picture or sound that is to be provided according to the movement of the terminal 100. Also, in the case of providing an autonomous driving information providing service, the expected data may include, for example, information for avoiding the collision of the autonomous vehicle (i.e., the terminal 100), traffic information, pedestrian information according to the movement of the vehicle, or the like.

According to various embodiments, the source edge data network 301 may transmit a message requesting the expected data, which the target edge data network 302 is expected to transmit to the terminal 100 after performance of the handover of the terminal 100, to the target edge data network 302. The message requesting the expected data may include at least one of information for identifying a service provided by the source edge data network 301 to the terminal 100 (e.g., an identifier of the terminal, a service identifier, an identifier of the edge application providing a service, an identifier of the application client receiving a service, or the like), position information of the terminal 100, information about the channel state of the terminal 100, or information about the performance of the terminal 100. The information for identifying the service and the position information of the terminal 100 may be transmitted to the target edge data network 302 as information for identifying the expected data.

According to various embodiments, the source edge data network 301 may configure (or set) a traffic rule for transmitting/receiving data (or signals) to/from the target edge data network 302. For example, the source edge data network 301 may configure the traffic rule such that an expected data request message may be transmitted to the target edge data network 302. The source edge data network 301 may transmit, to the first UPF 241, a message requesting the expected data request message to be transmitted to the target edge data network 302 according to the configured traffic rule. The first UPF 241 may configure a traffic path (traffic steering) such that the expected data request message may be transmitted to the target edge data network 302 according to the traffic rule. The traffic rule may be configured before or while the source edge data network 301 requests the target edge data network 302 for the expected data, and the expected data request message transmitted by the source edge data network 301 according to the configured traffic rule may be transmitted to the target edge data network 302 through the first UPF 241 and a second UPF 261.

According to various embodiments, the source edge data network 301 may receive data related to the service corresponding to the expected data from the target edge data network 302 in response to the expected data request. The data related to the service corresponding to the expected data will be described below in detail in the description of the operation of the target edge data network 302.

According to various embodiments, the source edge data network 301 may transcode the data related to the service corresponding to the expected data received from the target edge data network 302. As used herein, transcoding may refer, for example, to processing, selecting, or converting the data in accordance with another environment (e.g., network environment of the terminal 100) or generating new data based on the data. For example, the source edge data network 301 may convert the size, format, or the like of the data related to the service received from the target edge data network 302 such that the terminal 100 (or the first application client 111 of the terminal 100) may use the same.

Also, for example, the source edge data network 301 may transcode the data related to the service received from the target edge data network 302 according to at least one of the connection state with the terminal 100 or the position of the terminal 100. When it is determined that the connection state with the terminal 100 is poor, the source edge data network 301 may convert and reduce the size of the data related to the service received from the target edge data network 302. Alternatively, the source edge data network 301 may select data, which will be preferentially transmitted to the terminal 100 among the data related to the service received from the target edge data network 302, according to the position of the terminal 100 (or the movement path of the terminal 100). For example, the data to be preferentially transmitted to the terminal 100 may be selected according to the distance between the position of the terminal 100 and the service area of the target edge data network 302 or the movement path of the terminal 100 in the service area of the target edge data network 302.

Particularly, the source edge data network 301 may receive map data as the data related to the service corresponding to the expected data from the target edge data network 302 and may process the map data or generate other data (e.g., path determination information of the drone, driving determination information of the autonomous vehicle, or the like) from the map data.

According to various embodiments, the source edge data network 301 may transmit, to the terminal 100, the data related to the service corresponding to the expected data received from the target edge data network 302. Alternatively, the source edge data network 301 may transcode the data related to the service received from the target edge data network 302 and transmit the transcoded data related to the service to the terminal 100.

According to various embodiments, the target edge data network 302 may be an edge data network that provides a service to the terminal 100 after the handover of the terminal 100 is performed. The target edge data network 302 may be arranged at a position close to the second RAN 250.

According to various embodiments, the target edge data network 302 may execute a plurality of edge applications (e.g., a third edge application 313 and a fourth edge application 314) and may include an edge enabler server 322. However, the configuration of the target edge data network 302 is not limited to the configuration shown in FIG. 3A. Referring to FIG. 3A, the edge applications of the target edge data network 302 may be in the state of not forming a data session with the application clients of the terminal 100.

According to various embodiments, a second core network 260 may be a core network connected to the second RAN 250 and the target edge data network 302. The second core network 260 may include a second UPF 261 and may further include other network entities. The second UPF 261 may provide a data path between the terminal 100 and the target edge data network 302 after performance of the handover.

According to various embodiments, when the handover of the terminal 100 from the source edge data network 301 to the target edge data network 302 is performed, the application context (or application instance) for the terminal 100 of the source edge data network 301 may be relocated from the source edge data network 301 to the target edge data network 302. For example, according to the handover of the terminal 100, the application context (or application instance) for the terminal 100 of the first edge application 311 providing a service to the terminal 100 may be transmitted from the source edge data network 301 to the target edge data network 302.

The target edge data network 302 may provide the terminal 100 with the service provided by the first edge application 311, based on the application context (or application instance) for the terminal 100 received from the source edge data network 301. For example, the target edge data network 302 may execute the edge application (e.g., the third edge application 313) corresponding to the first edge application 311 based on the received application context (or application instance), and the executed edge application may provide the terminal 100 with the service provided by the first edge application 311. In the following description of FIG. 3A, it is assumed that the terminal 100 does not perform a handover to the target edge data network 302.

According to various embodiments, the target edge data network 302 may receive a message requesting the expected data, which the target edge data network 302 is expected to transmit to the terminal 100 in relation to the service after performance of the handover of the terminal 100 to the target edge data network 302, from the source edge data network 301. The message requesting the expected data received by the target edge data network 302 may be the message requesting the expected data transmitted by the source edge data network 301 described above.

According to various embodiments, the target edge data network 302 may obtain data related to the service corresponding to the requested expected data, based on the message requesting the expected data received from the source edge data network 301. More particularly, the target edge data network 302 may obtain data related to the service corresponding to the requested expected data, based on the information included in the message requesting the expected data.

The message requesting the expected data may include information for identifying the service and position information of the terminal 100. The target edge data network 302 may identify which service the requested expected data is related to, based on the information for identifying the service. In this case, the target edge data network 302 may determine whether the identified service may be provided to the terminal 100. When it is determined that the identified service may not be provided to the terminal 100, the target edge data network 302 may transmit, to the source edge data network 301, a message indicating the inability to provide the data related to the service corresponding to the requested expected data.

The target edge data network 302 may obtain data related to the identified service to be provided to the terminal 100 after the handover, based on the position information of the terminal 100 (e.g., the movement path of the terminal 100). The target edge data network 302 may determine an expected position or an expected movement path of the terminal 100 in the service area of the target edge data network 302 after the handover, based on the position information of the terminal 100 (e.g., the movement path of the terminal 100). The target edge data network 302 may obtain data related to the service to be provided to the terminal 100, based on the expected position or the expected movement path of the terminal 100 in the service area thereof.

In this case, the target edge data network 302 may request and receive the data related to the service from the service server 400. Alternatively, the target edge data network 302 may obtain the data related to the service through the edge application (e.g., the third edge application 313) capable of providing the identified service. That is, the data related to the service may be obtained through an operation for service provision of the edge application capable of providing the identified service.

According to various embodiments, the target edge data network 302 may identify data, which is to be preferentially transmitted to the terminal 100 among the obtained data related to the service, based on at least one of position information of the terminal 100, information about the channel state of the terminal 100, or information about the performance of the terminal 100.

For example, the target edge data network 302 may identify a partial area close to the position of the terminal 100 in the service area of the target edge data network 302, based on the position information of the terminal 100. Among the obtained data related to the service, the target edge data network 302 may identify data related to the service, which may be provided to the terminal 100 when the terminal 100 is located in the identified partial area, as the data to be preferentially transmitted to the terminal 100.

Alternatively, the target edge data network 302 may determine the priority of transmission of the obtained data related to the service according to whether it should be transmitted to the terminal 100 without delay. The target edge data network 302 may identify, in the obtained data related to the service, data that should be preferentially transmitted to the terminal 100 according to the determined priority, based on information about the channel state of the terminal 100 and information about the performance of the terminal 100 (e.g., based on whether the channel state of the terminal 100 is good or poor or whether the performance of the terminal 100 is good or poor). For example, when it is determined that the channel state of the terminal 100 is poor or the performance of the terminal 100 is poor, the target edge data network 302 may identify only some data with high priority as data that is to be preferentially transmitted to the terminal 100.

According to various embodiments, the target edge data network 302 may obtain data related to the service corresponding to the requested expected data, based on a message requesting the expected data received from the source edge data network 301 and a pre-stored expected data request history related to the service (hereinafter simply referred to as an expected data request history). The expected data request history may be a data table that stores information about the expected data request message (e.g., information for identifying the request message or information included in the request message) previously received by the target edge data network 302 from the edge data network (e.g., the source edge data network 301) and information about the data related to the service (e.g., information for identifying the data, information about the position where the data is stored, or the like) transmitted to the edge data network in response to the expected data request message.

For example, the target edge data network 302 may compare a message requesting the expected data received from the source edge data network 301 or information included in the message with information stored in the expected data request history. The target edge data network 302 may identify previous request history information (e.g., information about the request message or information about the data transmitted based thereon) stored in the expected data request history, corresponding to the received message requesting the expected data. The target edge data network 302 may obtain data related to the service corresponding to the requested expected data based on information about the previously transmitted data included in the identified request history information.

According to various embodiments, the edge enabler server 322 of the target edge data network 302 may store the expected data request history information related to the service and provide, based on the received expected data request message, the entities (e.g., the edge applications) of the target edge data network 302 with an MEC service providing the data related to the service corresponding to the requested expected data. That is, using the MEC service provided by the edge enabler server 322, based on the expected data request history related to the service, the target edge data network 302 may obtain data related to the service corresponding to the requested expected data.

In this case, the data related to the service and obtained by the target edge data network 302 based on the expected data request history may be data that has already been identified as data that is to be preferentially transmitted to the terminal 100 based on the previous request. Alternatively, based on the information included in the expected data request message received from the source edge data network 301, the target edge data network 302 may identify data that is to be preferentially transmitted to the terminal 100 among the obtained data related to the service based on the expected data request history.

According to various embodiments, the target edge data network 302 may transmit, to the source edge data network 301, the data related to the service corresponding to the requested expected data and obtained based on the message requesting the expected data. Alternatively, the target edge data network 302 may transmit, to the source edge data network 301, the data identified as data that is to be preferentially transmitted to the terminal 100 among the obtained data related to the service.

According to various embodiments, the target edge data network 302 may configure (or set) a traffic rule for transmitting/receiving data (or signals) to/from the source edge data network 301. For example, the target edge data network 302 may configure the traffic rule such that the data related to the service corresponding to the requested expected data (or the data related to the service and identified as data that is to be preferentially transmitted to the terminal 100) may be transmitted to the source edge data network 301.

For example, according to the configured traffic rule, the target edge data network 302 may transmit, to the second UPF 261, a message for requesting the data related to the service corresponding to the requested expected data (or the data related to the service and identified as data that is to be preferentially transmitted to the terminal 100) to be transmitted to the source edge data network 301. The second UPF 261 may configure a traffic path according to the traffic rule. The traffic rule may be configured before or while the target edge data network 302 transmits the data to the source edge data network 301, and the data transmitted by the target edge data network 302 according to the configured traffic rule may be transmitted to the source edge data network 301 through the second UPF 261 and the first UPF 241.

Figure 3B:
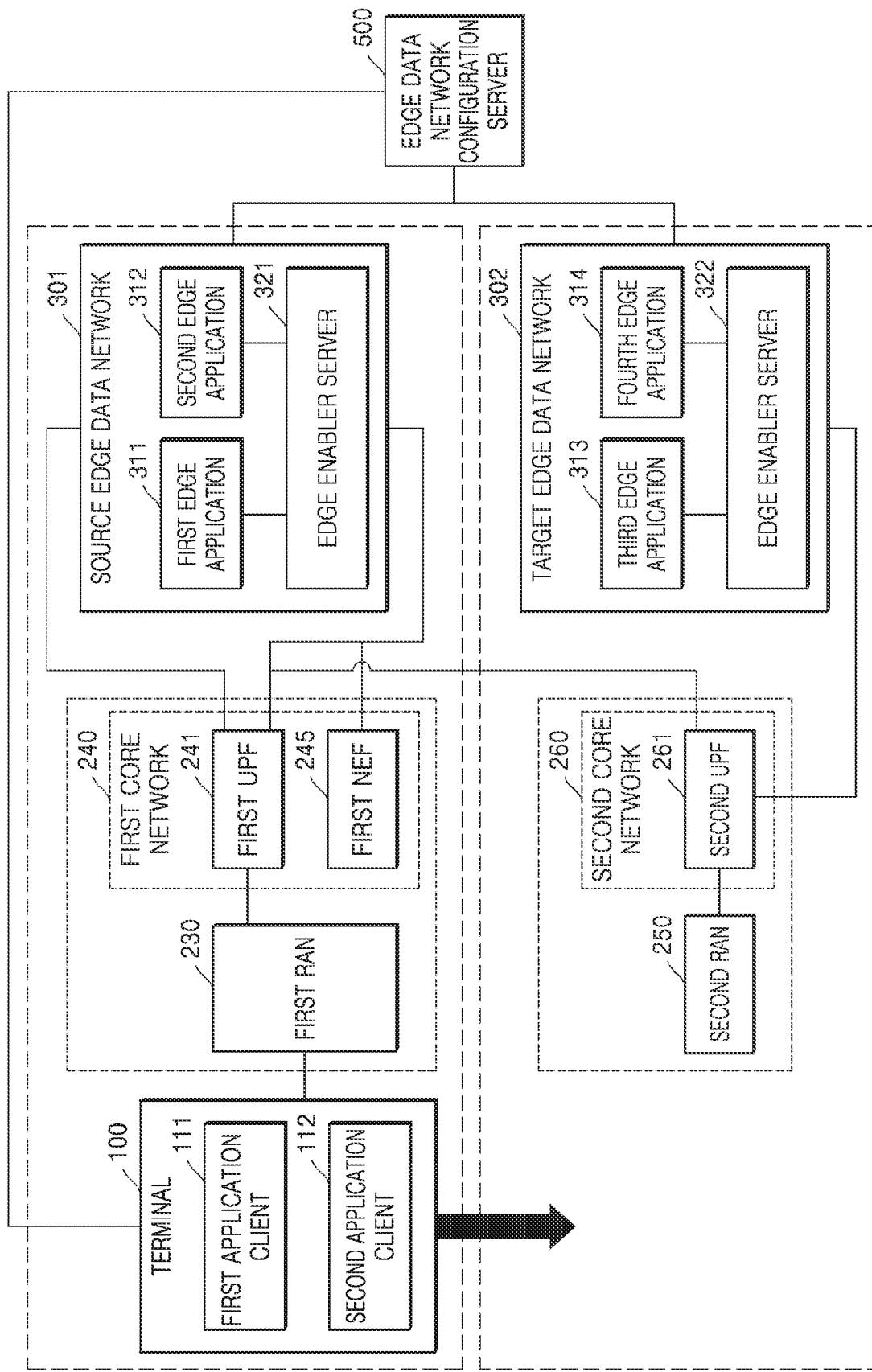
FIG. 3B is a diagram illustrating an example network environment for supporting an MEC-based service in a situation where a terminal performs a handover, according to various embodiments.

FIG. 3B is a diagram illustrating an example network environment for supporting an MEC-based service in a situation where a terminal performs a handover, according to various embodiments. The network environment of FIG. 3B may correspond to the addition of an edge data network configuration server 500 to the network environment illustrated in FIG. 3A.

According to various embodiments, the edge data network configuration server 500 may be connected to the edge data networks (e.g., the source edge data network 301 and the target edge data network 302) and the terminal 100. The edge data network configuration server 500 may be an initial access server through which the terminal 100 may receive configuration information for using an MEC service. For example, the edge data network configuration server 500 may provide edge data network configuration information to the edge enabler client 120 (FIG. 1) of the terminal 100. For example, upon receiving a message for requesting generation of an app context related to the application clients 111 and 112 from the terminal 100, the edge data network configuration server 500 may transmit a message for requesting distribution of the edge application corresponding to the application clients 111 and 112 to the edge data network.

Here, the edge data network configuration information may, for example, include information for connecting the terminal 100 to the edge data networks 301 and 302, information such as a uniform resource identifier (URI) for connecting with the edge enabler servers 321 and 322, or the like. The edge data network configuration server may be referred to, for example, as an edge data network management server, an edge configuration server, a configuration server, or the like and may function as a mobile edge platform manager (MEPM) or a multi-access edge orchestrator (MEO).

According to various embodiments, the edge data network configuration server 500 may identify the target edge data network 302 to which the terminal 100 is expected to perform a handover. For example, the edge data network configuration server 500 may receive, from the terminal 100, the source edge data network 301, and the target edge data network 302, position information of the terminal 100, information about the service area thereof, and information about the strength of signals transmitted/received to/from each other. The edge data network configuration server 500 may identify, based on the received information, the target edge data network 302 as an edge data network to which the terminal 100 is expected to perform a handover. Also, the edge data network configuration server 500 may transmit identification information about the identified target edge data network 302 to the source edge data network 301.

According to various embodiments, the edge data network configuration server 500 may receive, from the source edge data network 301, a message requesting to identify the target edge data network to which the terminal 100 is expected to perform a handover. The request message may include information about the position of the terminal 100. At the request of the source edge data network 301, the edge data network configuration server 500 may identify the target edge data network 302 as an edge data network to which the terminal 100 is expected to perform a handover and transmit identification information about the identified target edge data network 302 to the source edge data network 301.

According to various embodiments, the edge data network configuration server 500 may determine whether transmission of the expected data from the target edge data network 302 to the terminal 100 after performance of the handover will be delayed. For example, the edge data network configuration server 500 may predict a connection state between the terminal 100 and the target edge data network 302 after the terminal 100 has performed a handover from the source edge data network 301 to the target edge data network 302. For example, based on the predicted connection state between the terminal 100 and the target edge data network 302 after performance of the handover, the edge data network configuration server 500 may determine whether transmission of the expected data from the target edge data network 302 to the terminal 100 after performance of the handover will be delayed.

According to various embodiments, the edge data network configuration server 500 may receive, from the source edge data network 301, a message requesting determination about whether transmission of the expected data from the target edge data network 302 to the terminal 100 after performance of the handover will be delayed. The request message may include information about a predicted connection state between the terminal 100 and the target edge data network 302 after the handover described above in FIG. 3A or information for predicting the connection state. At the request of the source edge data network 301, the edge data network configuration server 500 may determine whether transmission of the expected data from the target edge data network 302 to the terminal 100 after performance of the handover will be delayed and transmit, to the source edge data network 301, information about whether the transmission of expected data will be delayed.

Figure 4:
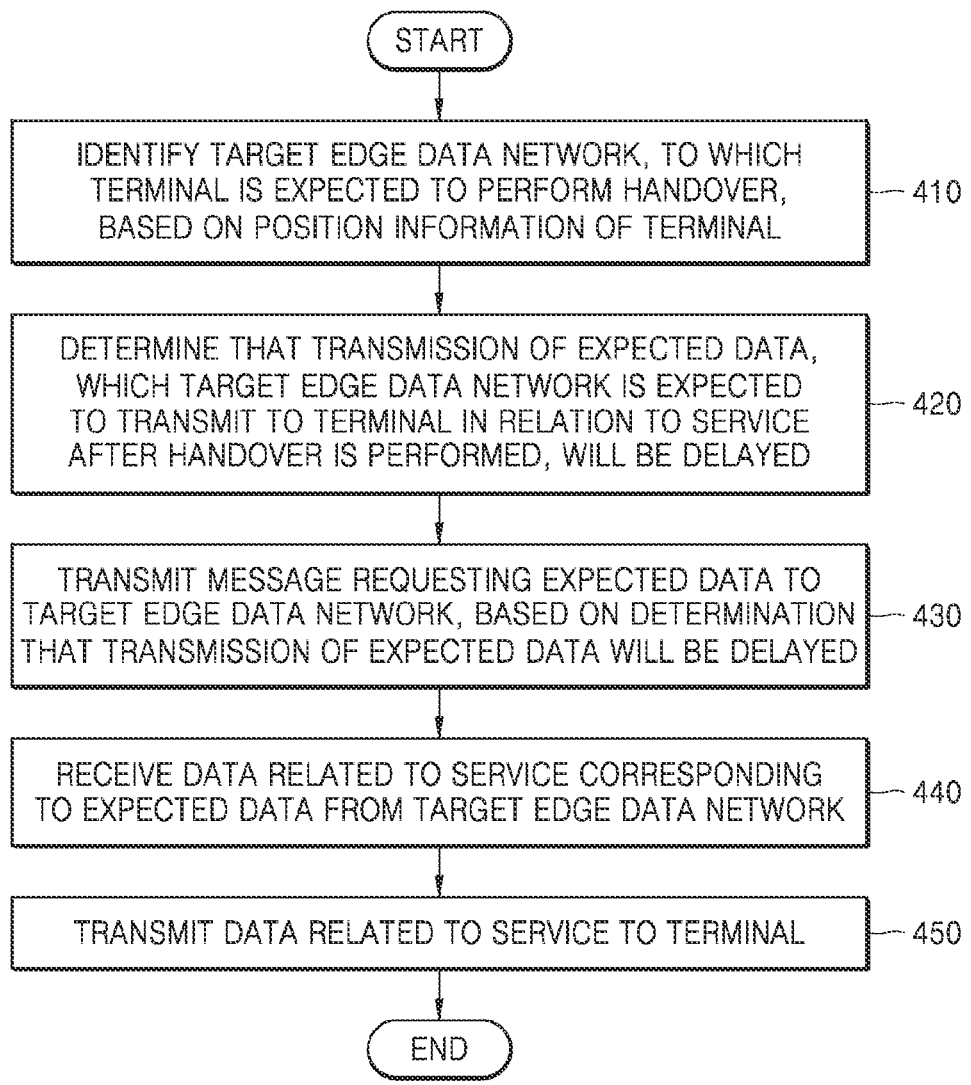
FIG. 4 is a flowchart illustrating an example method of providing, by a source edge data network, an MEC-based service to a terminal without and/or with reduced delay due to handover, according to various embodiments.

FIG. 4 is a flowchart illustrating an example method of providing, by a source edge data network, an MEC-based service to a terminal without and/or with reduced delay due to handover, according to various embodiments. Hereinafter, in the description of FIG. 4, redundant descriptions of contents overlapping with those of FIGS. 3A and 3B will be omitted for conciseness.

In operation 410, the source edge data network 301 may identify the target edge data network 302, to which the terminal 100 is expected to perform a handover, based on the position information of the terminal 100.

According to various embodiments, the source edge data network 301 may obtain the position information of the terminal 100. For example, the source edge data network 301 may receive the position information of the terminal 100 from at least one of the terminal 100 or the 3GPP network entity connected to the terminal 100.

According to various embodiments, the source edge data network 301 may identify the movement path of the terminal 100 based on the position information of the terminal 100. The source edge data network 301 may determine, based on the movement path of the terminal 100, the edge data network providing a service to a certain area as the target edge data network 302.

According to various embodiments, the source edge data network 301 may receive, from the edge data network configuration server 500, the identification information about the target edge data network 302 to which the terminal 100 is expected to perform a handover. Here, the target edge data network 302 may be identified as the edge data network, to which the terminal 100 is expected to perform a handover, by the edge data network configuration server 500 at the request of the source edge data network 301.

In operation 420, the source edge data network 301 may determine that transmission of the expected data, which the target edge data network 302 is expected to transmit to the terminal 100 in relation to the service after performance of the handover, will be delayed.

According to various embodiments, based on the predicted connection state between the terminal 100 and the target edge data network 302 after performance of the handover, the source edge data network 301 may determine that transmission of the expected data from the target edge data network 302 to the terminal 100 after performance of the handover will be delayed.

According to various embodiments, the source edge data network 301 may receive, from the edge data network configuration server 500, information about whether transmission of the expected data from the target edge data network 302 to the terminal 100 after performance of the handover will be delayed. Here, the information about whether the transmission of the expected data will be delayed may include, for example, information determined about whether the transmission of the expected data will be delayed, by the edge data network configuration server 500 at the request of the source edge data network 301.

According to various embodiments, the expected data may be data which the target edge data network 302 is expected to transmit to the terminals located in the service area of the target edge data network 302 in order to provide the service.

In operation 430, the source edge data network 301 may transmit a message requesting the expected data to the target edge data network 302 based on the determination that the transmission of the expected data will be delayed.

According to various embodiments, the message requesting the expected data may include at least one of information for identifying the service, position information of the terminal 100, information about the channel state of the terminal 100, or information about the capability of the terminal 100.

According to various embodiments, the source edge data network 301 may configure (or set) a traffic rule for transmitting/receiving data to/from the target edge data network 302. According to the configured traffic rule, the message requesting the expected data may be transmitted to the target edge data network 302.

According to various embodiments, the service provided by the source edge data network 301 may include at least one of a drone control service, an AR content providing service, a VR content providing service, or an autonomous driving information providing service.

In operation 440, the source edge data network 301 may receive the data related to the service corresponding to the expected data from the target edge data network 302.

In operation 450, the source edge data network 301 may transmit the data related to the service to the terminal 100.

According to various embodiments, the source edge data network 301 may transcode the data related to the service according to at least one of the connection state with the terminal 100 or the position of the terminal 100. The source edge data network 301 may transmit the transcoded data related to the service to the terminal 100.

Figure 5:
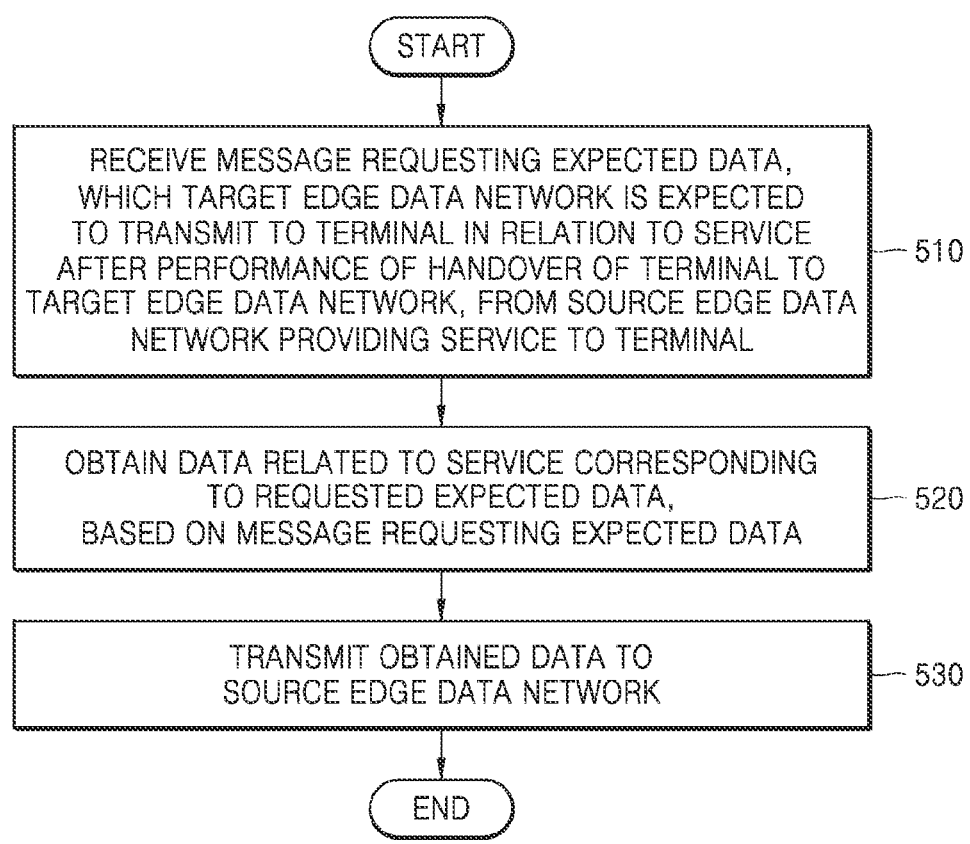
FIG. 5 is a flowchart illustrating an example method of providing, by a target edge data network, an MEC-based service to a terminal without delay and/or with reduced delay due to handover, according to various embodiments.

FIG. 5 is a flowchart illustrating an example method of providing, by a target edge data network, an MEC-based service to a terminal without delay and/or with reduced delay due to handover, according to various embodiments. Hereinafter, in the description of FIG. 5, redundant descriptions of contents overlapping with those of FIGS. 3A and 3B will be omitted for conciseness.

In operation 510, the target edge data network 302 may receive, from the source edge data network 301 providing a service to the terminal 100, a message requesting the expected data which the target edge data network 302 is expected to transmit to the terminal 100 in relation to the service after performance of the handover of the terminal 100 to the target edge data network 302.

According to various embodiments, the expected data may be data which the target edge data network 302 is expected to transmit to the terminals located in the service area of the target edge data network 302 in order to provide the service.

According to various embodiments, the message requesting the expected data may include at least one of information for identifying the service, position information of the terminal 100, information about the channel state of the terminal 100, or information about the capability of the terminal 100.

In operation 520, the target edge data network 302 may obtain the data related to the service corresponding to the requested expected data, based on the message requesting the expected data.

According to various embodiments, the target edge data network 302 may obtain the data related to the service corresponding to the requested expected data, based on the information for identifying the service and the position information of the terminal 100, which are included in the expected data request message.

According to various embodiments, the target edge data network 302 may obtain the data related to the service corresponding to the requested expected data, based on the message requesting the expected data and the pre-stored expected data request history related to the service.

According to various embodiments, the target edge data network 302 may identify data, which is to be preferentially transmitted to the terminal 100 among the obtained data related to the service, based on at least one of the position information of the terminal 100, the information about the channel state of the terminal 100, or the information about the performance of the terminal 100, which are included in the expected data request message.

In operation 530, the target edge data network 302 may transmit the obtained data to the source edge data network 301.

According to various embodiments, the target edge data network 302 may transmit, to the source edge data network 301, the data identified as data that is to be preferentially transmitted to the terminal 100 among the obtained data related to the service.

Figure 6A:
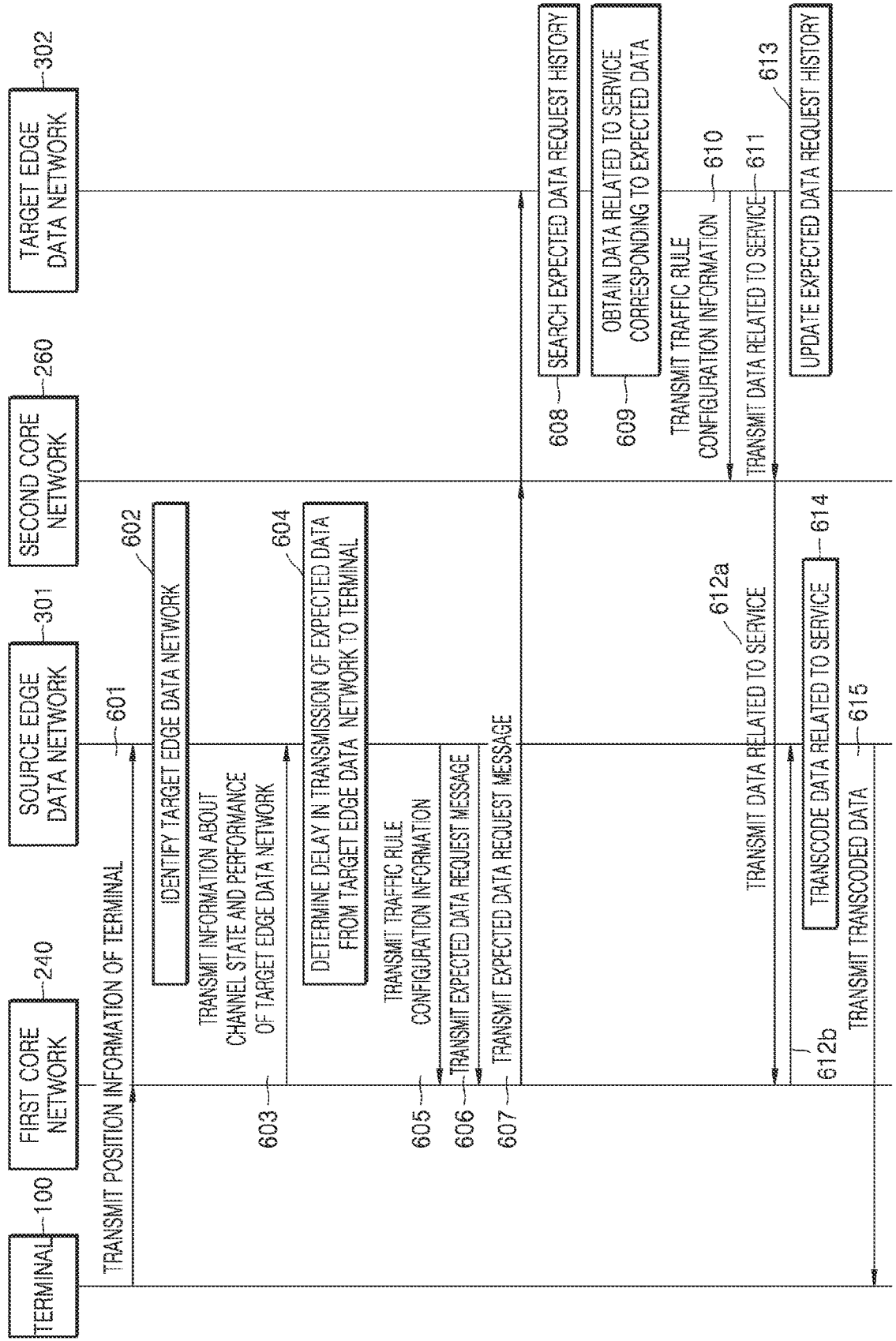
FIG. 6A is a signal flow diagram illustrating an example method of providing an MEC-based service to a terminal without delay and/or with reduced delay due to handover, according to various embodiments.

FIG. 6A is a signal flow diagram illustrating an example method of providing an MEC-based service to a terminal without delay and/or with reduced delay due to handover, according to various embodiments. Hereinafter, in the description of FIG. 6A, redundant descriptions of contents overlapping with those of FIGS. 3A, 3B, 4, and 5 will be omitted for conciseness.

Referring to FIG. 6A, in operation 601, the terminal 100 may transmit the position information of the terminal 100 to the source edge data network 301 through the first core network 240. Alternatively, although not illustrated in FIG. 6A, the first core network 240 (or the entity of the first core network 240) connected to the terminal 100 and the source edge data network 301 may transmit the position information of the terminal 100 to the source edge data network 301.

In operation 602, the source edge data network 301 may identify the target edge data network 302, to which the terminal 100 is expected to perform a handover, based on the position information of the terminal 100.

In operation 603, the first core network 240 may transmit the information about the channel state and performance of the target edge data network 302 to the source edge data network 301 in response to a request from the source edge data network 301 requesting the first core network 240 about the channel state and performance of the target edge data network 302. The source edge data network 301 may directly request the target edge data network 302 for information about the channel state and performance of the target edge data network 302 and receive the information therefrom.

In operation 604, the source edge data network 301 may predict the connection state between the terminal 100 and the target edge data network 302 after the handover and determine that transmission of the expected data, which the target edge data network 302 is expected to transmit to the terminal 100, will be delayed.

In operation 605, the source edge data network 301 may configure (or set) a traffic rule for transmitting/receiving data (or signals) to/from the target edge data network 302 and transmit traffic rule configuration information to the first core network 240. According to the traffic rule configuration, the UPF of the first core network 240 may configure a traffic path (traffic steering) such that an expected data request message transmitted by the source edge data network 301 may be transmitted to the target edge data network 302.

In operation 606, the source edge data network 301 may transmit an expected data request message to the first core network 240 for transmitting by the first core network to the target edge data network 302. In operation 607, according to the configured traffic rule, the first core network 240 (or the UPF thereof) may transmit an expected data request message to the target edge data network 302 through the second core network 260 (or the UPF thereof).

In operation 608, the target edge data network 302 may retrieve a request message corresponding to the expected data request message by searching the expected data request history. When the target edge data network 302 does not store the expected data request history, operation 608 may be omitted.

In operation 609, the target edge data network 302 may obtain the data related to the service corresponding to the requested expected data from the expected data request message. For example, the target edge data network 302 may obtain the data related to the service corresponding to the requested expected data, based on the information included in the expected data request message. Here, the data related to the service corresponding to the expected data may be obtained through the target edge application of the target edge data network 302. Alternatively, in operation 608, the target edge data network 302 may search the expected data request history to obtain the data related to the service corresponding to the expected data. The target edge data network 302 may identify data, which is to be preferentially transmitted to the terminal 100 among the obtained data related to the service, based on the information included in the expected data request message.

In operation 610, the target edge data network 302 may configure (or set) a traffic rule for transmitting/receiving data (or signals) to/from the source edge data network 301 and transmit traffic rule configuration information to the second core network. According to the traffic rule configuration, the UPF of the second core network 260 may configure a traffic path (traffic steering) such that the data transmitted by the target edge data network 302 may be transmitted to the source edge data network 301.

In operation 611, the target edge data network 302 may transmit the data related to the service corresponding to the requested expected data. Alternatively, the target edge data network 302 may transmit data identified as data that is to be preferentially transmitted to the terminal 100 among the obtained data related to the service. According to the configured traffic rule, the second core network 260 (or the UPF thereof) may transmit the data transmitted by the target edge data network 302, to the source edge data network 301 through the first core network 240. That is, the target edge data network 302 may transmit the data to the first core network 240 in operation 612a, and the first core network 240 may transmit the received data to the source edge data network 301 in operation 612b.

In operation 613, the target edge data network 302 may update the expected data request history based on the expected data request message received from the source edge data network 301. Operation 613 may be performed when the target edge data network 302 provides a service for the expected data request history.

In operation 614, the source edge data network 301 may transcode the data related to the service corresponding to the expected data transmitted by the target edge data network 302. Operation 614 may be omitted.

In operation 615, the source edge data network 301 may transmit the data (or the transcoded data) related to the service corresponding to the expected data to the terminal 100. Here, the data related to the service corresponding to the expected data may be transmitted to the terminal 100 through the source edge application of the source edge data network 301.

FIG. 6B is a signal flow diagram illustrating an example method of providing an MEC-based service to a terminal without delay and/or with reduced delay due to handover, according to various embodiments. Hereinafter, in the description of FIG. 6B, redundant descriptions of contents overlapping with those of FIGS. 3A, 3B, 4, 5, and 6A will be omitted for conciseness.

Referring to FIG. 6B, in operation 631, the terminal 100 may transmit the position information of the terminal 100 to the source edge data network 301 through the first core network 240. Alternatively, although not illustrated in FIG. 6B, the first core network 240 (or the entity of the first core network 240) connected to the terminal 100 and the source edge data network 301 may transmit the position information of the terminal 100 to the source edge data network 301.

In operation 632, the source edge data network 301 may transmit, to the edge data network configuration server 500, a message requesting to identify the target edge data network to which the terminal 100 is expected to perform a handover. The request message transmitted by the source edge data network 301 may, for example, include the position information of the terminal 100.

In operation 633, the edge data network configuration server 500 may identify the target edge data network 302, to which the terminal 100 is expected to perform a handover, based on the position information of the terminal 100.

In operation 634, the edge data network configuration server 500 may transmit identification information about the identified target edge data network 302 to the source edge data network 301.

In operation 635, the first core network 240 may transmit the information about the channel state and performance of the target edge data network 302 to the source edge data network 301 in response to a request from the source edge data network requesting the first core network 240 for information about the channel state and performance of the target edge network 302. The source edge data network 301 may request the target edge data network 302 or the edge data network configuration server 500 for information about the channel state and performance of the target edge data network 302 and receive the information therefrom.

In operation 636, the source edge data network 301 may transmit, to the edge data network configuration server 500, a message requesting to determine whether transmission of the expected data, which the target edge data network 302 is expected to transmit to the terminal 100 in relation to the service after performance of the handover of the terminal 100, will be delayed. The request message may include, for example, information about a predicted connection state between the terminal 100 and the target edge data network 302 after the handover as described above in FIG. 3A or information for predicting the connection state.

In operation 637, the edge data network configuration server 500 may determine that transmission of the expected data from the target edge data network 302 to the terminal 100 after performance of the handover will be delayed. The edge data network configuration server 500 may determine that transmission of the expected data based on the message received in operation 636.

In operation 638, the edge data network configuration server 500 may transmit, to the source edge data network 301, information that transmission of the expected data from the target edge data network 302 to the terminal 100 will be delayed.

In operation 639, the source edge data network 301 may configure (or set) a traffic rule for transmitting/receiving data (or signals) to/from the target edge data network 302 and transmit traffic rule configuration information to the first core network 240.

In operation 640, the source edge data network 301 may transmit an expected data request message to the first core network 240 for transmitting by the first core network to the target edge data network 302. In operation 641, according to the configured traffic rule, the first core network 240 (or the UPF thereof) may transmit an expected data request message to the target edge data network 302 through the second core network 260 (or the UPF thereof).

In operation 642, the target edge data network 302 may retrieve a request message corresponding to the expected data request message by searching the expected data request history. When the target edge data network 302 does not store the expected data request history, operation 642 may be omitted.

In operation 643, the target edge data network 302 may obtain the data related to the service corresponding to the requested expected data from the expected data request message.

In operation 644, the target edge data network 302 may configure (or set) a traffic rule for transmitting/receiving data (or signals) to/from the source edge data network 301 and transmit traffic rule configuration information to second core network 260.

In operation 645, the target edge data network 302 may transmit the data related to the service corresponding to the requested expected data to the source edge data network 301. According to the configured traffic rule, the second core network 260 (or the UPF thereof) may transmit the data transmitted by the target edge data network 302 in operation 645, to the first core network 240 in operation 646a and the first core network may transmit the data to the source edge data network 302 in operation 646b. That is, the target edge data network 302 may transmit the data to the first core network 240, and the first core network 240 may transmit the received data to the source edge data network 301.

In operation 647, the target edge data network 302 may update the expected data request history based on the expected data request message received from the source edge data network 301. Operation 647 may be performed when the target edge data network 302 provides a service for the expected data request history.

In operation 648, the source edge data network 301 may transcode the data related to the service corresponding to the expected data transmitted by the target edge data network 302. Operation 648 may be omitted.

In operation 649, the source edge data network 301 may transmit the data (or the transcoded data) related to the service corresponding to the expected data to the terminal 100.

FIG. 7 is a signal flow diagram illustrating an example method of providing an MEC-based service to a terminal without delay and/or with reduced delay due to handover, according to various embodiments. Hereinafter, in the description of FIG. 7, redundant descriptions of contents overlapping with those of FIGS. 3A, 3B, 4, 5, 6A, and 6B will be omitted for conciseness.

FIG. 7 relates to an example embodiment in which a master edge data network 303 performs the operation of the target edge data network 302. More particularly, while FIGS. 3A, 3B, 4, 5, 6A, and 6B relate to example embodiments in which the target edge data network 302 provides a service based on the expected data request history, FIG. 7 relates to an example embodiment in which the master edge data network 303 managing the source edge data network 301 and the target edge data network 302 provides a service based on the expected data request history.

According to various embodiments, when a plurality of edge data networks are clustered, the master edge data network 303 may be a management server managing the plurality of edge data networks. For example, in FIG. 7, the master edge data network 303 may manage the source edge data network 301 and the target edge data network 302 connected to the master edge data network 303.

According to various embodiments, the master edge data network may be referred to as a server for managing the edge data network, a management server, or the like. For convenience, in the following disclosure related to FIG. 7, a server for managing an edge data network will be referred to as a master edge data network.

Referring to FIG. 7, in operation 701, the target edge data network 302 may transmit a message requesting an expected data request history update to the master edge data network 303. In this case, the target edge data network 302 may have received the expected data request message from another edge data network (e.g., the source edge data network 301) and transmitted the data related to the service corresponding to the requested expected data in response thereto.

The target edge data network 302 may transmit the previously-received expected data request message and the information (or history) about the data transmitted in response thereto to the master edge data network 303 and request to update the expected data request history. The expected data request history of the master edge data network 303 may perform the same function or role as the expected data request history of the target edge data network 302 of FIGS. 3A, 3B, 4, 5, 6A, and 6B.

In operation 702, the master edge data network 303 may update the pre-stored expected data request history based on the update request message of the target edge data network 302.

In operation 703, the master edge data network 303 may configure and transmit to the first core network 240 a DNS and traffic rule such that the expected data request message transmitted by the source edge data network 301 to the target edge data network 302 may be transmitted to the master edge data network 303 and the data related to the service corresponding to the expected data transmitted by the master edge data network 303 may be transmitted to the source edge data network 301. According to the configured DNS and traffic rule, the first core network 240 (or the UPF thereof) may configure a traffic path (traffic steering) such that the expected data request message transmitted by the source edge data network 301 may be transmitted to the master edge data network 303 and the data related to the service corresponding to the expected data transmitted by the master edge data network 303 may be transmitted to the source edge data network 301.

In operations 704a and 704b, the terminal 100 may transmit the position information of the terminal 100 to the source edge data network 301 through the first core network 240. Alternatively, in an operation 704', the first core network 240 (or the entity of the first core network 240) connected to the terminal 100 and the source edge data network 301 may transmit the position information of the terminal 100 to the source edge data network 301.

In operation 705, the source edge data network 301 may identify the target edge data network 302, to which the terminal 100 is expected to perform a handover, based on the position information of the terminal 100.

In operation 706, the source edge data network 301 may receive information about the channel state and performance of the target edge data network 302 from the first core network 240 or the target edge data network 302 (e.g., in response to a request from the source edge data network). Alternatively, the source edge data network 301 may receive information about the channel state and performance of the target edge data network 302 from the master edge data network 303.

In operation 707, the source edge data network 301 may predict the connection state between the terminal 100 and the target edge data network 302 after the handover and determine that transmission of the expected data, which the target edge data network 302 is expected to transmit to the terminal 100, will be delayed.

In operation 708, the source edge data network 301 may transmit an expected data request message to the target edge data network 302. In operation 709, according to the configured traffic rule, the first core network 240 (or the UPF thereof) may transmit the expected data request message to the master edge data network 303 instead of the target edge data network 302.

In operation 710, the master edge data network 303 may retrieve a request message corresponding to the expected data request message by searching the expected data request history. In the expected data request history of the master edge data network 303, information corresponding to the expected data request message transmitted by the terminal 100 may have already been stored at the request of another edge data network (e.g., the target edge data network 302) or the like.

In operation 711, the master edge data network 303 may obtain the data related to the service corresponding to the requested expected data from the expected data request message. For example, in operation 710, the master edge data network 303 may search the expected data request history to obtain the data related to the service corresponding to the expected data. The master edge data network 303 may identify data, which is to be preferentially transmitted to the terminal 100 among the obtained data related to the service, based on the information included in the expected data request message.

In operation 712, the master edge data network 303 may transmit the data related to the service corresponding to the requested expected data to the source edge data network 301. Alternatively, the master edge data network 303 may transmit, to the source edge data network 301, the data identified as data that is to be preferentially transmitted to the terminal 100 among the obtained data related to the service. In operation 713, according to the configured traffic rule, the first core network 240 (or the UPF thereof) may transmit, to the source edge data network 301, the data transmitted by the master edge data network 303.

In operation 714, the source edge data network 301 may transcode the data related to the service corresponding to the expected data transmitted by the master edge data network 303. Operation 714 may be omitted.

In operation 715, the source edge data network 301 may transmit the data (or the transcoded data) related to the service corresponding to the expected data to the terminal 100.

FIG. 8 is a signal flow diagram illustrating an example method of providing an MEC-based service to a terminal after handover, according to various embodiments.

FIG. 8 relates to an example procedure after the source edge data network 301 transmits the data related to the service corresponding to the expected data to the terminal 100 in FIGS. 4, 5, 6A, 6B, and 7. More particularly, FIG. 8 illustrates an example method of providing, by the target edge data network, a service after the terminal 100 performs a handover to the target edge data network 302.

Referring to FIG. 8, in operation 801, the terminal 100 (or the application client of the terminal 100) or the source edge data network 301 (or the edge application of the source edge data network 301) may determine to perform the handover of the terminal 100 to the target edge data network.

When it is determined to perform the handover in operation 801, in operation 802, the source edge data network 301 may transmit the application context (or application instance) for the terminal 100 of the source edge data network 301 to the target edge data network 302. Accordingly, the application context (or application instance) for the terminal 100 of the edge application of the source edge data network 301 providing a service to the terminal 100 may be relocated to the target edge data network 302, and the handover may be completed according to the relocation of the application context (or application instance) for the terminal 100.

In operation 803, the terminal 100 may request the target edge data network 302 to provide a service. In this case, the service requested by the terminal 100 may be the service provided by the source edge data network 301 to the terminal 100 before the handover. Also, the service provision request of the terminal 100 may be to request the target edge data network 302 for data maintaining continuity with the data related to the service provided by the source edge data network 301 to the terminal 100. In this case, the request of the terminal 100 may be a request for data other than the data related to the service previously provided by the source edge data network 301 to the terminal 100 in the example embodiments of FIGS. 4, 5, 6A, 6B, and 7.

In operation 804, the target edge data network 302 may identify data that is to be provided to the terminal 100 in relation to the service requested by the terminal 100. In this case, among the data that is to be provided to the terminal 100 in relation to the service, as data to be transmitted to the terminal 100, the target edge data network 302 may identify data other than the data related to the service previously provided to the terminal 100 at the request of the source edge data network 301 before performance of the handover.

In operation 805, the target edge data network 302 may transmit the identified other data related to the service to the terminal 100.

Figure 9:
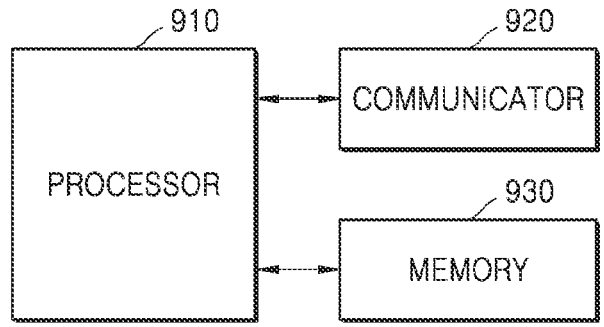
FIG. 9 is a block diagram illustrating an example edge data network according to various embodiments.

FIG. 9 is a block diagram illustrating an example edge data network according to various embodiments.

The edge data network of FIG. 9 may be the source edge data network 301, the target edge data network 302, or the master edge data network 303 described herein.

As illustrated in FIG. 9, the edge data network of the disclosure may include a processor 910, a communicator 920, and a memory 930. However, the components of the edge data network are not limited to the components illustrated in FIG. 9. For example, the edge data network may include more components or fewer components than the above components. In addition, the processor 910, the communicator 920, and the memory 930 may be implemented as a single chip.

According to various embodiments, the processor 910 may control a series of processes in which the edge data network may operate according to example embodiments described above. For example, the edge data network according to an example embodiment may control the components of the edge data network to provide a service to the terminal. More particularly, the edge data network may control the components of the edge data network to provide an MEC-based service to the terminal 100 without delay and/or with reduced delay due to handover. The processor 910 may include a plurality of processors, and the processor 910 may perform an operation of providing an MEC-based service to the terminal 100 without delay and/or with reduced delay due to handover by executing a plurality of instructions (or programs) stored in the memory 930.

According to various embodiments, the processor 910 may control a series of processes in which the edge applications and the edge enabler server of the edge data network 301, 302, or 303 variously illustrated in FIGS. 3A, 3B, 4, 5, 6A, 6B, 7, and 8 may operate. For example, the edge application and the edge enabler server may be implemented as a plurality of instructions (or programs). The processor 910 may perform the operations of the edge application and the edge enabler server by executing a plurality of instructions (or programs).

According to various embodiments, when the edge data network of FIG. 9 is the source edge data network 301, the processor 910 may identify the target edge data network, to which the terminal 100 is expected to perform a handover, based on the position information of the terminal 100. The processor 910 may determine that transmission of expected data, which the target edge data network 302 is expected to transmit to the terminal 100 in relation to the service after the performance of the handover, will be delayed. The processor 910 may control transmitting a message requesting the expected data to the target edge data network 302, based on the determination that the transmission of the expected data will be delayed. The processor 910 may control receiving data related to the service corresponding to the expected data from the target edge data network 302 and may control transmitting the data related to the service to the terminal 100.

According to various embodiments, when the edge data network of FIG. 9 is the target edge data network 302, the processor 910 may control receiving a message requesting expected data, which the target edge data network is expected to transmit to the terminal in relation to the service after performance of a handover of the terminal to the target edge data network, from the source edge data network providing the service to the terminal. The processor 910 may obtain data related to the service corresponding to the requested expected data based on the message requesting the expected data. The processor 910 may control transmitting the obtained data to the source edge data network.

The communicator (including communication circuitry) 920 may transmit/receive signals to/from an external device (e.g., the terminal 100), a network (e.g., the 3GPP network), a server (e.g., the service server 400), or another edge data network. The signals transmitted/received by the communicator 920 may include control information and data. The communicator 920 may include, for example, an RF transmitter for upconverting and amplifying a transmitted signal and an RF receiver for low-noise-amplifying and downconverting a received signal. However, this is merely an embodiment of the communicator 920, and the components of the communicator 920 are not limited to the RF transmitter and the RF receiver. Also, the communicator 920 may receive a signal through a radio channel and output the signal to the processor 910 and may transmit a signal output from the processor 910, through a radio channel.

According to various embodiments, the communicator 920 may transmit/receive data to/from the terminal 100, the 3GPP network, or another edge data network under the control of the processor 910. For example, the communicator 920 may request position information of the terminal 100 through the terminal 100 or the 3GPP network and receive the requested position information. Also, the communicator 920 may transmit/receive a message requesting the expected data to/from another edge data network and transmit/receive data related to the service corresponding to the expected data. Also, the communicator 920 may transmit data related to the service (e.g., data related to the service received from another edge data network) to the terminal 100.

According to various embodiments, the memory 930 may store a plurality of instructions (or programs) and data necessary for the operation of the edge data network. Also, the memory 930 may store control information or data included in the signals transmitted/received by the edge data network. The memory 930 may include a storage medium or a combination of storage media such as ROM, RAM, hard disk, CD-ROM, and DVD. Also, the memory 930 may include a plurality of memories, and according to an embodiment of the disclosure, the memory 930 may store a plurality of instructions (or programs) for providing a service to the terminal 100 by the edge data network according to the various example embodiments described above.

According to various embodiments, the memory 930 may store expected data request history data or data received from another edge data network.

Figure 10:
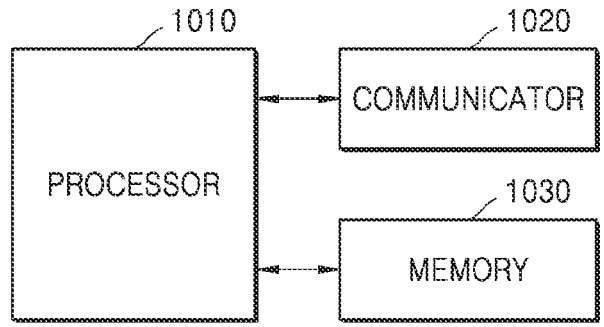
FIG. 10 is a block diagram illustrating an example terminal according to various embodiments.

FIG. 10 is a block diagram illustrating an example terminal according to various embodiments.

As illustrated in FIG. 10, the terminal 100 described herein may include a processor 1010, a communicator 1020, and a memory 1030. However, the components of the terminal 100 are not limited to the components illustrated in FIG. 10. For example, the terminal 100 may include more components or fewer components than the above components. In addition, the processor 1010, the communicator 1020, and the memory 1030 may be implemented as a single chip.

According to various embodiments, the processor 1010 may control a series of processes in which the terminal 100 may operate according to various example embodiments described above. The processor 1010 may include a plurality of processors, and the processor 1010 may perform an operation of the terminal 100 by executing a plurality of instructions (or programs) stored in the memory 1030.

According to various embodiments, the processor 1010 may control a series of processes in which the application clients 111 and 112, the edge enabler client 120, and the 3GPP communication layer 130 of the terminal 100 illustrated in FIG. 1 or 3A may operate. For example, the application clients 111 and 112, the edge enabler client 120, and the 3GPP communication layer 130 may be implemented as a plurality of instructions (or programs). The processor 1010 may perform the operations of the application clients 111 and 112, the edge enabler client 120, and the 3GPP communication layer 130 by executing a plurality of instructions (or programs).

The communicator (including communication circuitry) 1020 may transmit/receive signals to/from the network (e.g., the 3GPP network 200) or the server (e.g., the edge data network or the service server 400). The signals transmitted/received by the communicator 1020 may include control information and data. The communicator 1020 may include, for example, an RF transmitter for upconverting and amplifying a transmitted signal and an RF receiver for low-noise-amplifying and downconverting a received signal. However, this is merely a non-limiting example embodiment of the communicator 1020, and the components of the communicator 1020 are not limited to the RF transmitter and the RF receiver. Also, the communicator 1020 may receive a signal through a radio channel and output the signal to the processor 1010 and may transmit a signal output from the processor 1010, through a radio channel.

According to various embodiments, the communicator 1020 may transmit/receive data to/from the 3GPP network 200, the edge data network, and the service server 400. For example, the communicator 1020 may transmit a request for data to the edge data network or the service server 400 through the 3GPP network 200 and receive the requested data from the edge data network or the service server 400.

According to various embodiments, the memory 1030 may store a plurality of instructions (or programs) and data necessary for the operation of the terminal 100. Also, the memory 1030 may store control information or data included in the signals transmitted/received by the terminal 100. The memory 1030 may include a storage medium or a combination of storage media such as ROM, RAM, hard disk, CD-ROM, and DVD. Also, the memory 1030 may include a plurality of memories. According to various embodiments, the memory 1030 may store a plurality of instructions (or programs) for operating the terminal 100 according to the example embodiments described above.

The methods according to the various embodiments described in the specification or the claims may be implemented by hardware, software, or a combination thereof.

When the methods are implemented by software, a computer-readable storage medium or a computer program product may be provided to store one or more programs (software modules). The one or more programs stored in the computer-readable storage medium or the computer program product may be configured for execution by one or more processors in an electronic device. The one or more programs may include instructions for causing the electronic device to execute the methods according to the various embodiments described in the specification or the claims.

These programs (software modules or software) may be stored in random access memories (RAMs), nonvolatile memories including flash memories, read only memories (ROMs), electrically erasable programmable ROMs (EE-PROMs), magnetic disc storage devices, compact disc-ROMs (CD-ROMs), digital versatile discs (DVDs), other types of optical storage devices, or magnetic cassettes. Alternatively, the programs may be stored in a memory configured by a combination of some or all of such storage devices. Also, each of the memories may be provided in plurality.

Also, the programs may be stored in an attachable storage device that may be accessed through a communication network such as Internet, Intranet, local area network (LAN), wide LAN (WLAN), or storage area network (SAN), or through a communication network configured by any combination thereof. Such a storage device may be connected through an external port to an apparatus performing an embodiment of the disclosure. Also, a separate storage device on a communication network may be connected to an apparatus performing an embodiment of the disclosure.

In the disclosure, the term "computer program product" or "computer-readable recording medium" may collectively refer to a medium such as a memory, a hard disk installed in a hard disk drive, and a signal. The "computer program product" or "computer-readable recording medium" may be a means provided to a software computer system including instructions for configuring the length of a timer for receiving a missing data packet based on a network metric corresponding to a determined event according to the disclosure.

The described example embodiments may provide an apparatus and method capable of effectively performing an MEC-based service.

In the above particular example embodiments, the components included in the disclosure are expressed in the singular or plural according to the presented example embodiments. However, the singular or plural expressions are selected suitably according to the presented situations for convenience of description, the disclosure is not limited to the singular or plural components, and the components expressed in the plural may even be configured in the singular or the components expressed in the singular may even be configured in the plural.

While the disclosure has been illustrated and described with reference to various example embodiments, it will be understood that the various example embodiments are intended to be illustrative, not limiting. It will be further understood that various modifications may be made therein without departing from the true spirit and full scope of the disclosure, including the appended claims and equivalents thereof.

What is claimed is:

1. A method of providing, by a source edge data network, a service to a terminal in a wireless communication system, the method comprising:
   identifying a target edge data network, to which the terminal is expected to perform a handover, based on position information of the terminal;
   determining whether transmission of expected data, which the target edge data network is expected to transmit to the terminal in relation to the service after the handover is performed, will be delayed;
   transmitting a message requesting the expected data, to the target edge data network, based on determining that the transmission of the expected data will be delayed;
   receiving data related to the service corresponding to the expected data from the target edge data network; and
   transmitting the data related to the service to the terminal.

2. The method of claim 1, wherein the expected data comprises data which the target edge data network is expected to transmit, to terminals located in a service area of the target edge data network, to provide the service.

3. The method of claim 1, wherein the identifying of the target edge data network comprises:
obtaining the position information of the terminal;
identifying a movement path of the terminal based on the position information of the terminal; and
determining an edge data network providing the service to a certain area, as the target edge data network, based on the movement path of the terminal.

4. The method of claim 3, wherein the obtaining of the position information of the terminal comprises receiving the position information of the terminal from at least one of the terminal or a 3rd Generation Partnership Project (3GPP) network entity connected to the terminal.

5. The method of claim 1, wherein the determining of whether the transmission of the expected data will be delayed is based on a predicted connection state between the terminal and the target edge data network after the handover is performed.

6. The method of claim 1, wherein the message requesting the expected data comprises at least one of information for identifying the service, the position information of the terminal, information about a channel state of the terminal, or information about a capability of the terminal.

7. The method of claim 1, further comprising transcoding the data related to the service according to at least one of a connection state with the terminal or a position of the terminal, wherein the transmitting of the data related to the service comprises transmitting the transcoded data related to the service to the terminal.

8. The method of claim 1, further comprising configuring a traffic rule for transmitting/receiving data to/from the target edge data network.

9. The method of claim 1, wherein the service comprises at least one of a drone control service, an augmented reality (AR) content providing service, a virtual reality (VR) content providing service, or an autonomous driving information providing service.

10. A source edge data network providing a service to a terminal in a wireless communication system, the source edge data network comprising:
a communicator comprising communication circuitry;
a memory storing a plurality of instructions; and
at least one processor configured to execute the plurality of instructions to:
identify a target edge data network, to which the terminal is expected to perform a handover, based on position information of the terminal;
determine whether transmission of expected data, which the target edge data network is expected to transmit to the terminal in relation to the service after the handover is performed, will be delayed;
transmit a message requesting the expected data, to the target edge data network, based on determining that the transmission of the expected data will be delayed;
receive data related to the service corresponding to the expected data from the target edge data network; and
transmit the data related to the service to the terminal.

11. The source edge data network of claim 10, wherein the expected data comprises data which the target edge data network is expected to transmit, to terminals located in a service area of the target edge data network, to provide the service.

12. The source edge data network of claim 10, wherein the at least one processor is further configured to execute the plurality of instructions to:
obtain the position information of the terminal;
identify a movement path of the terminal based on the position information of the terminal; and
determine an edge data network providing the service to a certain area, as the target edge data network, based on the movement path of the terminal.

13. The source edge data network of claim 10, wherein the at least one processor is further configured to execute the plurality of instructions to determine whether the transmission of the expected data from the target edge data network to the terminal after the handover is performed will be delayed, based on a predicted connection state between the terminal and the target edge data network after the handover is performed.

14. The source edge data network of claim 12, wherein the at least one processor is further configured to execute the plurality of instructions to receive the position information of the terminal from at least one of the terminal or a 3rd Generation Partnership Project (3GPP) network entity connected to the terminal.

15. The source edge data network of claim 10, wherein the message requesting the expected data comprises at least one of information for identifying the service, the position information of the terminal, information about a channel state of the terminal, or information about a capability of the terminal.

16. The source edge data network of claim 10, wherein the at least one processor is further configured to execute the plurality of instructions to:
transcode the data related to the service according to at least one of a connection state with the terminal or a position of the terminal; and
transmit the transcoded data related to the service to the terminal.

17. The source edge data network of claim 10, wherein the at least one processor is further configured to execute the plurality of instructions to configure a traffic rule for transmitting/receiving data to/from the target edge data network.

18. The source edge data network of claim 10, wherein the service comprises at least one of a drone control service, an augmented reality (AR) content providing service, a virtual reality (VR) content providing service, or an autonomous driving information providing service.

19. A method of providing, by a source edge data network, a service to a terminal in a wireless communication system, the method comprising:
identifying a target edge data network, to which the terminal is expected to perform a handover, based on position information of the terminal;
determining whether data transmission to the terminal, which the target edge data network is expected to perform in relation to the service after the handover is performed, will be delayed;
transmitting a data request message to the target edge data network, based on determining that the data transmission to the terminal will be delayed;
receiving data related to the service from the target edge data network, in response to the data request message; and
transmitting the data related to the service to the terminal.

20. The method of claim 19, wherein the data transmission comprises data transmission which the target edge data network is expected to perform, to terminals located in a service area of the target edge data network, to provide the service.

21. The method of claim 19, wherein the identifying of the target edge data network comprises:
obtaining the position information of the terminal;

identifying a movement path of the terminal based on the position information of the terminal; and determining an edge data network providing the service to a certain area, as the target edge data network, based on the movement path of the terminal.

22. The method of claim 21, wherein the obtaining of the position information of the terminal comprises:

receiving the position information of the terminal from at least one of the terminal or a 3rd Generation Partnership Project (3GPP) network entity connected to the terminal.

23. The method of claim 19, wherein the determining of whether the data transmission to the terminal will be delayed is based on a predicted connection state between the terminal and the target edge data network after the handover is performed.

24. The method of claim 19, wherein the data request message comprises at least one of information for identifying the service, the position information of the terminal, information about a channel state of the terminal, or information about a capability of the terminal.

25. The method of claim 19, further comprising:

transcoding the data related to the service according to at least one of a connection state with the terminal or a position of the terminal, wherein the transmitting of the data related to the service comprises transmitting the transcoded data related to the service to the terminal.

26. The method of claim 19, further comprising:

configuring a traffic rule for transmitting data to the target edge data network or receiving data from the target edge data network.

27. The method of claim 19, wherein the service comprises at least one of a drone control service, an augmented reality (AR) content providing service, a virtual reality (VR) content providing service, or an autonomous driving information providing service.

28. A source edge data network configured to provide a service to a terminal in a wireless communication system, the source edge data network comprising:

a memory storing a plurality of instructions; and at least one processor configured to execute the plurality of instructions to:

identify a target edge data network, to which the terminal is expected to perform a handover, based on position information of the terminal;

determine whether data transmission to the terminal, which the target edge data network is expected to perform in relation to the service after the handover is performed, will be delayed;

transmit a data request message to the target edge data network, based on determining that the data transmission to the terminal will be delayed;

receive data related to the service from the target edge data network, in response to the data request message; and transmit the data related to the service to the terminal.

29. The source edge data network of claim 28, wherein the data transmission comprises data transmission which the target edge data network is expected to perform, to terminals located in a service area of the target edge data network, to provide the service.

30. The source edge data network of claim 28, wherein the at least one processor is further configured to execute the plurality of instructions to:

obtain the position information of the terminal;

identify a movement path of the terminal based on the position information of the terminal; and determine an edge data network providing the service to a certain area, as the target edge data network, based on the movement path of the terminal.

31. The source edge data network of claim 30, wherein the at least one processor is further configured to execute the plurality of instructions to:

receive the position information of the terminal from at least one of the terminal or a 3rd Generation Partnership Project (3GPP) network entity connected to the terminal.

32. The source edge data network of claim 28, wherein the at least one processor is further configured to execute the plurality of instructions to:

determine whether the data transmission to the terminal will be delayed, based on a predicted connection state between the terminal and the target edge data network after the handover is performed.

33. The source edge data network of claim 28, wherein the data request message comprises at least one of information for identifying the service, the position information of the terminal, information about a channel state of the terminal, or information about a capability of the terminal.

34. The source edge data network of claim 28, wherein the at least one processor is further configured to execute the plurality of instructions to:

transcode the data related to the service according to at least one of a connection state with the terminal or a position of the terminal; and transmit the transcoded data related to the service to the terminal.

35. The source edge data network of claim 28, wherein the at least one processor is further configured to execute the plurality of instructions to:

configure a traffic rule for transmitting data to the target edge data network or receiving data from the target edge data network.

36. The source edge data network of claim 28, wherein the service comprises at least one of a drone control service, an augmented reality (AR) content providing service, a virtual reality (VR) content providing service, or an autonomous driving information providing service.

* * * * *